(12) United States Patent
Machida

(10) Patent No.: US 6,209,060 B1
(45) Date of Patent: Mar. 27, 2001

(54) DISK ARRAY DEVICE FOR ENSURING STABLE OPERATION WHEN A CONSTITUENT DISK DEVICE IS REPLACED

(75) Inventor: Tatsuhiko Machida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/063,012

(22) Filed: Apr. 21, 1998

(30) Foreign Application Priority Data

Oct. 30, 1997 (JP) ...................................... 9-299209

(51) Int. Cl.[7] ................. G06F 3/06; G06F 11/00
(52) U.S. Cl. ................................... 711/114; 714/7
(58) Field of Search ................. 711/114; 714/7

(56) References Cited

U.S. PATENT DOCUMENTS 5,548,712 * 8/1996 Larson et al. ............................ 714/7

FOREIGN PATENT DOCUMENTS

| 913763 | * 5/1999 | (EP) . |
| 7-121315 | 5/1995 | (JP) . |
| 8-190462 | 7/1996 | (JP) . |
| 8-190463 | 7/1996 | (JP) . |

OTHER PUBLICATIONS

D. Patterson, et al., "A Case for Redundant Arrays of Inexpensive Disks (RAID)", ACM Sigmod Conference, pp. 109–116, Jun. 1–3, 1988.

* cited by examiner

Primary Examiner—Reginald G. Bragdon
(74) Attorney, Agent, or Firm—Staas & Halsey LLP

(57) ABSTRACT

When it is determined in a disk replacement determining section that a disk has been replaced during system operation, a reference disk device is selected by a reference disk selecting section from disk devices other than a disk device having been replaced. The firmware (firmware storing area) of the reference disk device is copied into the replaced disk device.

12 Claims, 18 Drawing Sheets

| DISK DEVICE | 30-1 | 30-2 | 30-3 | 30-4 | · · · | 30-m |
|---|---|---|---|---|---|---|
| TYPE | A | A | A | A | · · · | A |
| VERSION NUMBER OF FIRMWARE | 0003 | 0003 | 0003 | 0003 | · · · | 0003 |
| DATE | 96/10/11 | 96/10/11 | 96/10/12 | 96/10/11 | · · · | 96/10/11 |
| CAPACITY | 2G | 2G | 2G | 2G | · · · | 2G |
| INHIBITED FIRMWARE | 0001 | 0001 | 0001 | 0001 | · · · | 0001 |

FIG.8A

| TYPE | B |
|---|---|
| VERSION NUMBER OF FIRMWARE | 0003 |
| DATE | 96/10/11 |
| CAPACITY | 2G |
| INHIBITED FIRM | 0001 |

FIG.8B

| TYPE | A |
|---|---|
| VERSION NUMBER OF FIRMWARE | 0001 |
| DATE | 96/10/11 |
| CAPACITY | 2G |
| INHIBITED FIRM | 0002 |

FIG.8C

| TYPE | A |
|---|---|
| VERSION NUMBER OF FIRMWARE | 0002 |
| DATE | 96/10/11 |
| CAPACITY | 2G |
| INHIBITED FIRM | 0001 |

FIG.8D

| TYPE | A |
|---|---|
| VERSION NUMBER OF FIRMWARE | 0004 |
| DATE | 96/10/11 |
| CAPACITY | 2G |
| INHIBITED FIRM | 0001 |

FIG.19

| TYPE A | |
|---|---|
| VERSION NUMBER OF FIRMWARE | MAIN BODY |
| 0001 | FWA1 |
| 0002 | FWA2 |
| 0003 | FWA3 |
| 0004 | FWA4 |

| TYPE B | |
|---|---|
| VERSION NUMBER OF FIRMWARE | MAIN BODY |
| 0001 | FWB1 |
| 0002 | FWB2 |
| 0003 | FWB3 |
| 0004 | FWB4 |

DISK ARRAY DEVICE FOR ENSURING STABLE OPERATION WHEN A CONSTITUENT DISK DEVICE IS REPLACED

FIELD OF THE INVENTION

The present invention relates to a disk array device for accessing a plurality of disk devices in parallel and executing input and output of data.

BACKGROUND OF THE INVENTION

Currently, a magnetic disk device, which is regarded as one satisfying requirements such as large capacity and rapid data transfer, is widely used as an external storage device for a computer system.

In recent years, a disk array device has received attention as a device which further satisfies high reliability and low price in addition to the above requirements. The disk array device is obtained by arranging a plurality of compact disk devices into which data is distributed for storage therein respectively.

David A. Patterson et al. of the University of California at Berkeley released a paper in which a large amount of data was distributed to many physical disks, and a disk array device for realizing redundancy of data in the event of disk failure was evaluated with classification thereof from Level 1 to Level 5 (ACM SIGMOD Conference, Chicago, Jun. 1–3, 1988, P109 to P116). The levels 1 to 5 for classifying a disk array device proposed by David A. Patterson et al. are referred to as RAID (Redundant Arrays of Inexpensive Disks) 1 to 5.

All the disk array devices have redundant data therein. Accordingly, even if a disk device constituting an array can not be used because of some problem and data can not be read out therefrom, it is possible to recover disappeared data by using the redundant data and remaining data.

However, if any of the disk devices remains faulty, the redundancy of the disk array device is low although recovery of the data is possible with difficulty. For this reason, when a disk device constituting the array is faulty, the disk device is removed from the arrayed disk devices as quickly as possible and a normal disk device needs to be incorporated therein anew.

Accordingly, when a disk device is faulty, the faulty disk is replaced with another disk for maintenance. But a version number of the firmware recorded in the disk device used for maintenance may be different from that of the disk devices which are already operating in the disk array device.

As the arrayed disk devices are operated by logically correlating a plurality of disk devices to each other as described above, it is desirable that all operations be the same on the correlated disks. That is because usage of disk devices with different version numbers of the firmware may cause contradiction in control logic, which may in turn generate an operational error.

SUMMARY OF THE INVENTION

It is an object of the present invention to realize a disk array device which insures stable operations even when a disk device constituting an array is replaced.

Each disk device constituting a disk array device has firmware for operating itself on each of the disk media. Each of the disk devices reads in firmware on a memory when power is turned ON and is controlled according to the firmware after completion of the operation for reading the firmware in.

Accordingly, to solve the problems as well as to achieve the object as described above, a disk array device according to the present invention comprises a logical disk consisting of an I/O device for storing data therein and an I/O device for storing therein redundant data pared with the data, a lower device interface control section connected to a plurality of I/O devices constituting the logical disk for transferring data to and from the I/O devices, an upper device interface control section connected to an upper device as well as to the lower device interface control section for analyzing an operational instruction to the logical disk issued from the upper device and also for transferring data to and from the lower device interface control section, and a control unit for controlling the lower device interface control section and the upper device interface control section. Each of the I/O devices has a rewritable nonvolatile storage medium with a control program controlling the device itself and a version number of the control program stored therein.

The disk array device is also characterized in that the control unit has a detecting unit for detecting that any of the plurality of I/O devices has been replaced, and a copying unit for transferring and storing in an I/O device detected by the detecting unit a control program for I/O devices other than the one among the plurality of I/O devices.

With the disk array device according to the present invention, a control program of a replaced disk is matched with a control program of an existing disk, so that the reliability of a disk array device can be improved.

A disk array device according to the present invention comprises a logical disk consisting of an I/O device for storing data therein and an I/O device for storing therein redundant data prepared with the data, a lower device interface control section connected to a plurality of i/O devices constituting the logical disk for transferring data to and from the I/O devices, an upper device interface control section connected to an upper device as well as to the lower device interface control section for analyzing an operational instruction to the logical disk issued from the upper device and also for transferring data to and from the lower device interface control section, and a control unit for controlling the lower device interface control section and the upper device interface control section. Each of the I/O devices has a rewritable nonvolatile storage medium with a control program controlling the device itself and a version number of the control program stored therein. The disk array device is also characterized in that the control unit has a detecting unit for detecting that any of the plurality of I/O devices has been replaced, a reference device selecting unit for selecting, when it is detected by the detecting unit that any of the I/O devices has been replaced, an I/O device other than the replaced one from the plurality of I/O devices, and a copying unit for transferring and storing a control program stored in the I/O device selected by the reference device selecting unit in the replaced I/O device.

With the disk array device according to the present invention, when a disk is replaced during system operation, a reference disk is selected from the disk devices other than the disk device having been replaced in the step of disk replacement, and firmware of the reference disk is copied into the disk device having been replaced in the disk replacement step, so that, in addition to improvement of the reliability of the disk array device, firmware can be updated to the replaced disk even during system operation. As a result, a time for maintenance is not required, and for this reason convenience of the devices can be improved.

In a disk array device according to the present invention, the reference disk selecting unit previously allocates at least two disk devices among the plurality of disk devices as reference disks and selects, when either one of the two disk devices is a disk device having been replaced in the step of disk replacement described above, another disk device as a reference disk device.

With the disk array device according to the present invention, when either one the two disk devices having previously been allocated as reference disks is a disk device having been replaced in the step of disk replacement described above, another disk device is selected as a reference disk device, so that a logical disk can be maintained at any time in fixed firmware when the disk is replaced.

A disk array device according to the present invention comprises a logical disk consisting of an I/O device for storing data therein and an I/O device for storing therein redundant data prepared with the data, a lower device interface control section connected to a plurality of I/O devices constituting the logical disk for transferring data to and from the I/O devices, an upper device interface control section connected to an upper device as well as to the lower device interface control section for analyzing an operational instruction to the logical disk issued from the upper device and also for transferring data to and from the lower device interface control section, and a control unit for controlling the lower device interface control section and the upper device interface control section. Each of the I/O devices has a rewritable nonvolatile storage medium with a control program controlling the device itself and a version number of the control program stored therein. The disk array device is also characterized in that the control unit has a storing unit for previously storing therein header information such as a version number of a control program in correlation to each of the I/O devices; a detecting unit for detecting that any of the plurality of I/O devices has been replaced; a reference device selecting unit for selecting, when it is detected by the detecting unit that any of the I/O devices has been replaced, an I/O device having a version number of a control program equal to that of the control program before replacement of the I/O device of the plurality of I/O devices after replacement of the I/O device by referring to the header information stored in the storing unit; and a copying unit for transferring and storing a control program stored in the I/O device selected by the reference device selecting unit in the replaced I/O device.

With the disk array device according to the present invention, when a disk is replaced during system operation, by referring to header information constituting firmware for each disk device, a disk device having a version number of firmware common to that of the disk device before replacement of the disk is selected as a reference disk, and firmware for the reference disk is copied into the disk device having been replaced, so that the firmware can be updated to the replaced disk even during system operation in addition to improvement of the reliability of the disk array device. As a result, a time for maintenance is not required, and for this reason convenience of the device can be improved.

A disk array device according to the present invention comprises a plurality of disk devices each having firmware and operating according to the firmware, one or a plurality of spare disk devices each having firmware and functioning as a spare for any of the plurality of disk devices according to the firmware, and a disk array control device connected to the plurality of disk devices as well as to one or a plurality of spare disk devices for controlling data transfer between an upper device and the plurality of disk devices and that between each of the disk devices and one or a plurality of spare disks. The disk array control device comprises a determining unit for determining whether any disk has been replaced or not during system operation; a reference disk selecting unit for selecting, when it is determined by the determining unit that any disk has been replaced, a reference disk from one or a plurality of spare disk devices; and a copying unit for copying firmware for the reference disk selected by the reference disk selecting unit into a disk device replaced in the disk replacement step.

With the disk array device according to the present invention, when a disk is replaced during system operation, one or any of the plurality of spare disk devices is selected as a reference disk, and the firmware for the reference disk is copied into the disk having been replaced, so that firmware enabling maintenance of a physical disk at any time with a fixed version number can be loaded to the replaced disk even during system operation. With this feature, in addition to the reliability of the disk array, throughput thereof in operation can be improved.

In a disk array device according to the present invention, when the disk device having been replaced in the disk replacement step has inhibited firmware having previously been decided, a copying operation by the copying unit is stopped based on the recognition that an error has occurred.

With the disk array device according to the present invention, when the disk device having been replaced in the disk replacement step has inhibited firmware having previously been decided, a copying operation by the copying unit is stopped based on the recognition that an error has occurred, so that the disk devices having been replaced are not always recognized as objects to be operated, and using any disk device having incompatible firmware can be prevented before it is used. With this feature, the reliability of a disk array device can be further improved.

A disk array device according to the present invention comprises a plurality of disk devices each having firmware including header information such as a version number of the firmware and operating according to the firmware, a disk device for loading with a plurality of types of firmware each having a different version number of firmware respectively stored therein, and a disk array control device connected to the plurality of disk devices as well as to the disk device for loading for controlling data transfer between an upper device and the plurality of disk devices and that between each of the disk devices and the disk device for loading. The disk array control device comprises a storing unit for previously storing therein header information constituting firmware for each of the disk devices; a determining unit for determining whether any disk has been replaced during system operation; a reference firmware selecting unit for extracting, when it is determined by the determining unit that any disk has been replaced, one firmware having a firmware version number equal of that of firmware for the disk device before replacement of the disk among the firmware stored in the disk device for loading by referring to the header information stored in the storing unit and selecting the extracted firmware as reference firmware; and a copying unit for copying the reference firmware selected by the reference firmware selecting unit into the replaced disk device.

With the disk array device according to the present invention, a disk device for loading with a plurality of types of firmware, each having a different version number of firmware respectively stored therein, is prepared, and when a disk is replaced during system operation, the firmware (inside the disk device for loading) having a firmware version number common to that of the disk device before replacement of the disk is copied into the disk device having been replaced as reference firmware by referring to header information, so that the firmware with which a state of a logical disk before and after the disk replacement can be maintained is loaded to the replaced disk even during system operation according to application of the disk device for loading provided for maintenance. With this feature, in addition to the reliability of the disk array, throughput thereof for the operation can be improved.

Other objects and features of this invention will become understood from the following description with reference to the accompanying drawings.

BRIEF DESCRIPTION OF THE DRAWINGS

FIGS. 8A–8D are views each showing a type of header information for a replaced disk in Embodiment 1;

FIG. 19 is a view for explaining information on loading of the disk device for loading according to Embodiment 8;

DESCRIPTION OF THE PREFERRED EMBODIMENT

Detailed description is made hereinafter for preferred embodiments of the disk array device according to the present invention with reference to the related drawings.

Figure 1:
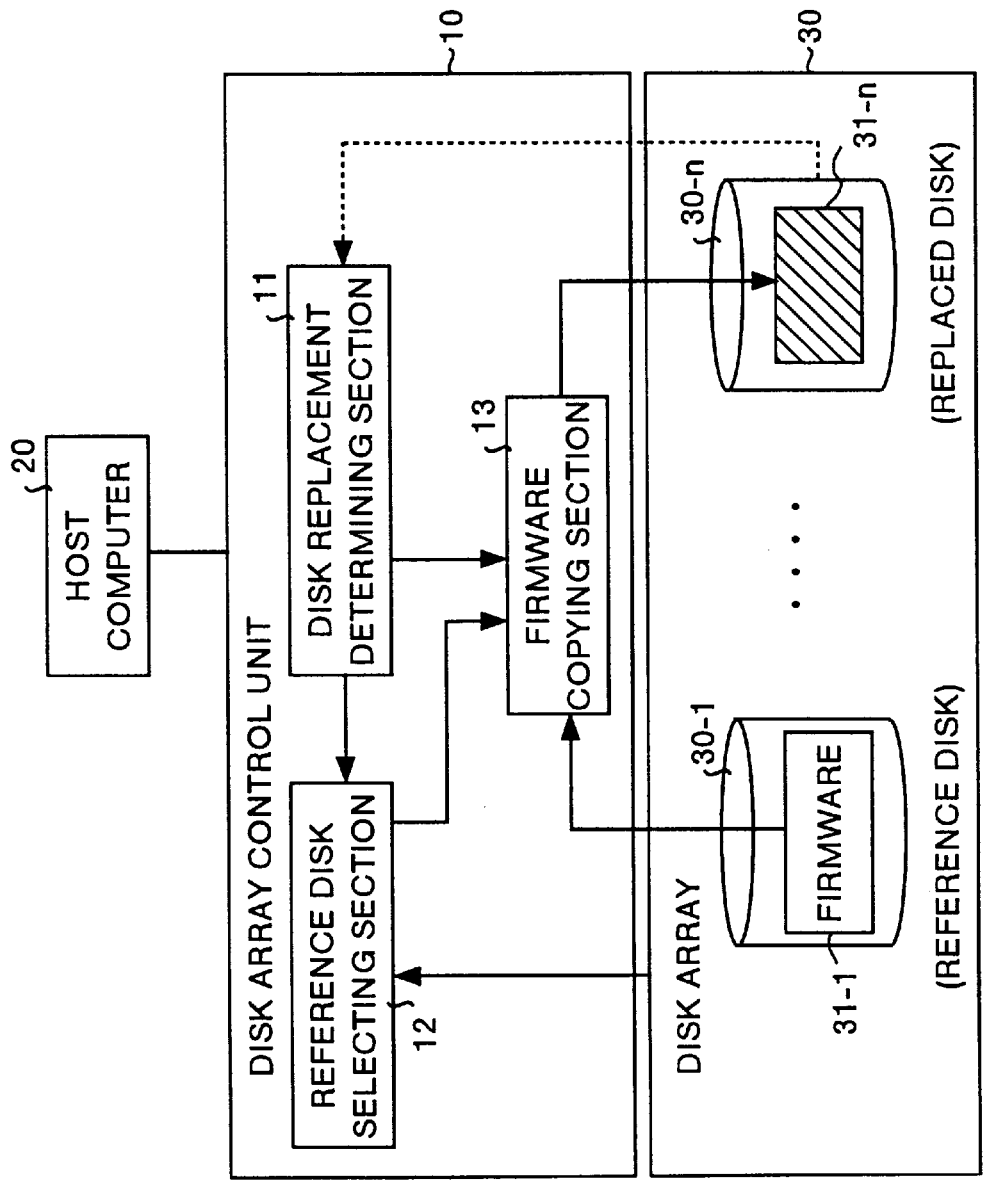
FIG. 1 is a block diagram showing principles of the disk array device according to Embodiment 1 of the present invention.

First, a description is made of the principles. FIG. 1 is a block diagram showing principles of a disk array device according to Embodiment 1 of the present invention. The disk array device shown in FIG. 1 comprises a disk array 30 comprising a plurality of disk devices 30-1 to 30-n, each storing therein data transferred from a host computer 20 as an upper device, a disk array control device 10 connecting the plurality of disk devices 30-1 to 30-n in parallel to each other for controlling data transfer between the host computer 20 and each of the disk devices 30-1 to 30-n. It should be noted that the host computer 20 instructs the disk array control device 10 to write data therein and read out data therefrom.

The disk array control device 10 comprises a disk replacement determining section 11, a reference disk selecting section 12, and a firmware copying section 13. The disk replacement determining section 11 determines, when any disk device in the disk array 30 is replaced due to its failure or the like, whether the replacement is actually performed.

The reference disk selecting section 12 selects, when it is detected by the disk replacement determining section 11 that the replacement has been performed, a disk device with firmware to be copied into a replaced disk device stored therein from the disk devices constituting the disk array. This selected disk device is referred to as a reference disk.

Logic for selection of a reference disk may require any disk of which an address is the smallest in the disk devices or in which a minimum version number of firmware among the disk devices is stored. It is needless to say that the present invention is not limited to the logic for selection.

The firmware copying section 13 instructs, when it is detected by the disk replacement determining section 11 that the replacement of the disk device is actually performed, a disk device (e.g., the disk device 30-1) selected by the reference disk selecting section 12 to read out firmware stored in a firmware storing area. Then, the firmware copying section 13 instructs the new disk having been replaced to transfer the read out firmware as well as to store the firmware in the firmware storing area.

As described above, copying of firmware can be realized between disk devices. With the configuration shown in Embodiment 1, when disk replacement is detected in the disk replacement determining section 11, a reference disk device is selected by the reference disk selecting section 12. Then, the firmware for the reference disk device is copied into the disk device having been replaced by the firmware copying section 13. As a result, each firmware version number for disk devices constituting the disk array can be maintained to a fixed one.

Figure 2:
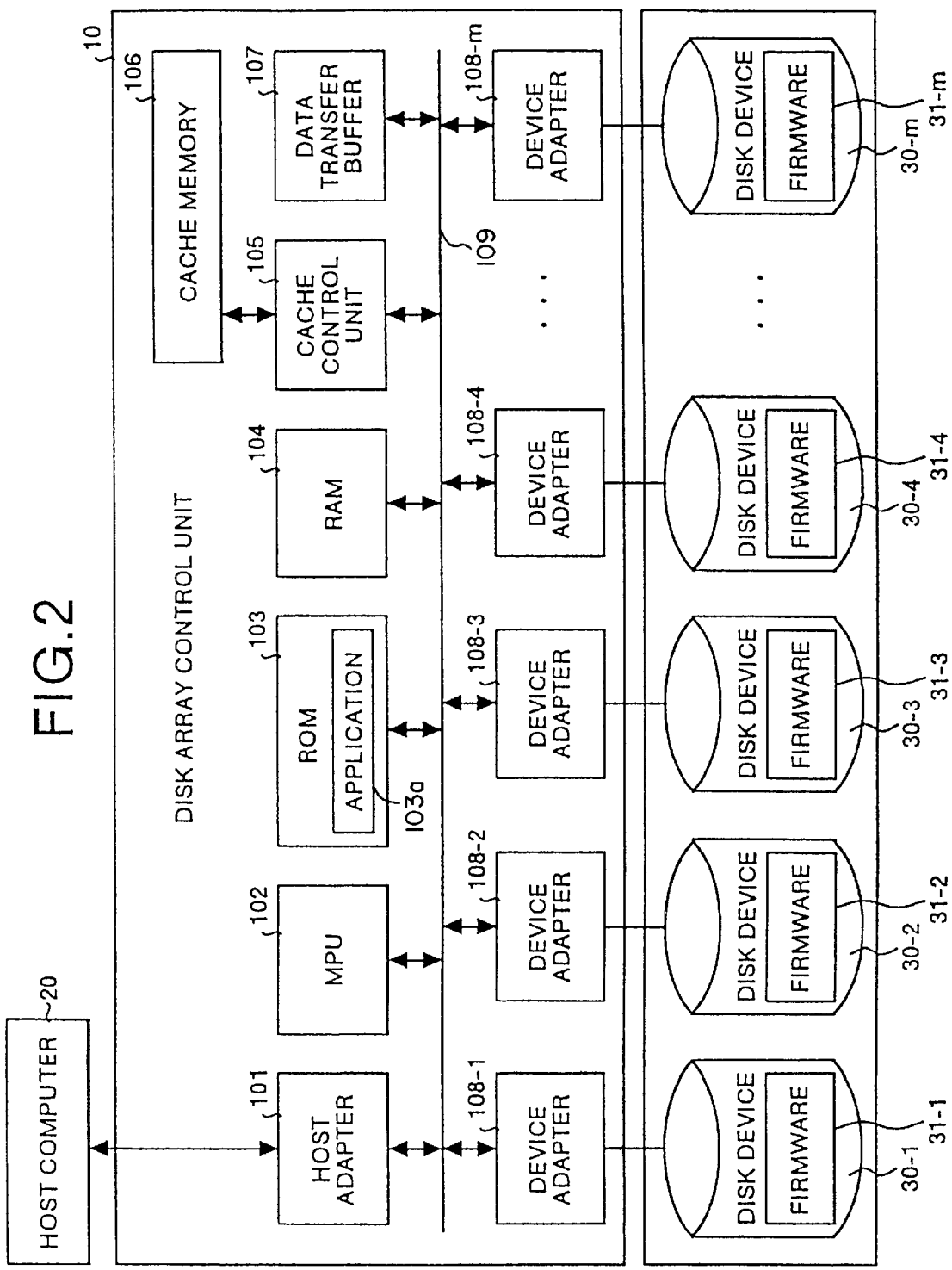
FIG. 2 is a block diagram showing an example of hardware configuration for the disk array device according to Embodiment 1 of the present invention.

Next description is made for a case where the functional blocks are realized as hardware. FIG. 2 is a block diagram showing an example of hardware configuration for the disk array device according to Embodiment 1 of the present invention.

The disk array control device 10 comprises, as shown in FIG. 2, a host adapter 101 as an upper device interface control section, a MPU 102, a ROM 103, a RAM 104, a cache control section 105, a cache memory 106, a data transfer buffer 107, a device adapter 108-1 to 108-m (m: natural number) as a lower device interface control section, and an internal bus 109. It should be noted that each of the units are connected to the internal bus 109, and the cache memory 106 is connected to the internal bus 109 through the cache control section 105.

The host adapter 101 is connected to the host computer 20 and interfaces between the host computer 20 and the disk array control device 10. The MPU 102 controls entire operations of the disk array control device 10 according to a program (including an application 103a) stored in the ROM 103. This MPU executes, other than the ordinary control for the disk array, the processing for copying firmware for the reference disk device into a disk device having been replaced due to its failure, according to the principles described above (Refer to FIG. 1).

The ROM 103 stores therein program such as the application 103a for realizing functions for the disk replacement determining section 11, reference disk selecting section 12, and the firmware copying section 13, other than the OS (operating system). The RAM 104 is used as a work area for the MPU 102 for extracting various types of programs.

The cache control section 105 indirectly connects the cache memory 106 to the internal bus 109, and controls data transfer between each of the units connected to the internal bus 109 and the cache memory 106. The cache memory 106 is a unit for caching data therein.

The data transfer buffer 107 is a memory for temporarily accumulating data for transfer. This data transfer buffer 107 temporarily accumulates firmware read out from the reference disk device based on the principles described above, and then transfers the firmware to a firmware storing area for a disk device having been replaced.

The disk adapters 108-1, 108-2, 108-3, 108-4, ..., 108-m are connected to the disk devices 30-1, 30-2, 30-3, 30-4, ..., 30-m respectively, and each of the adapters interfaces between each disk device and the disk array control device 10.

Figure 3:
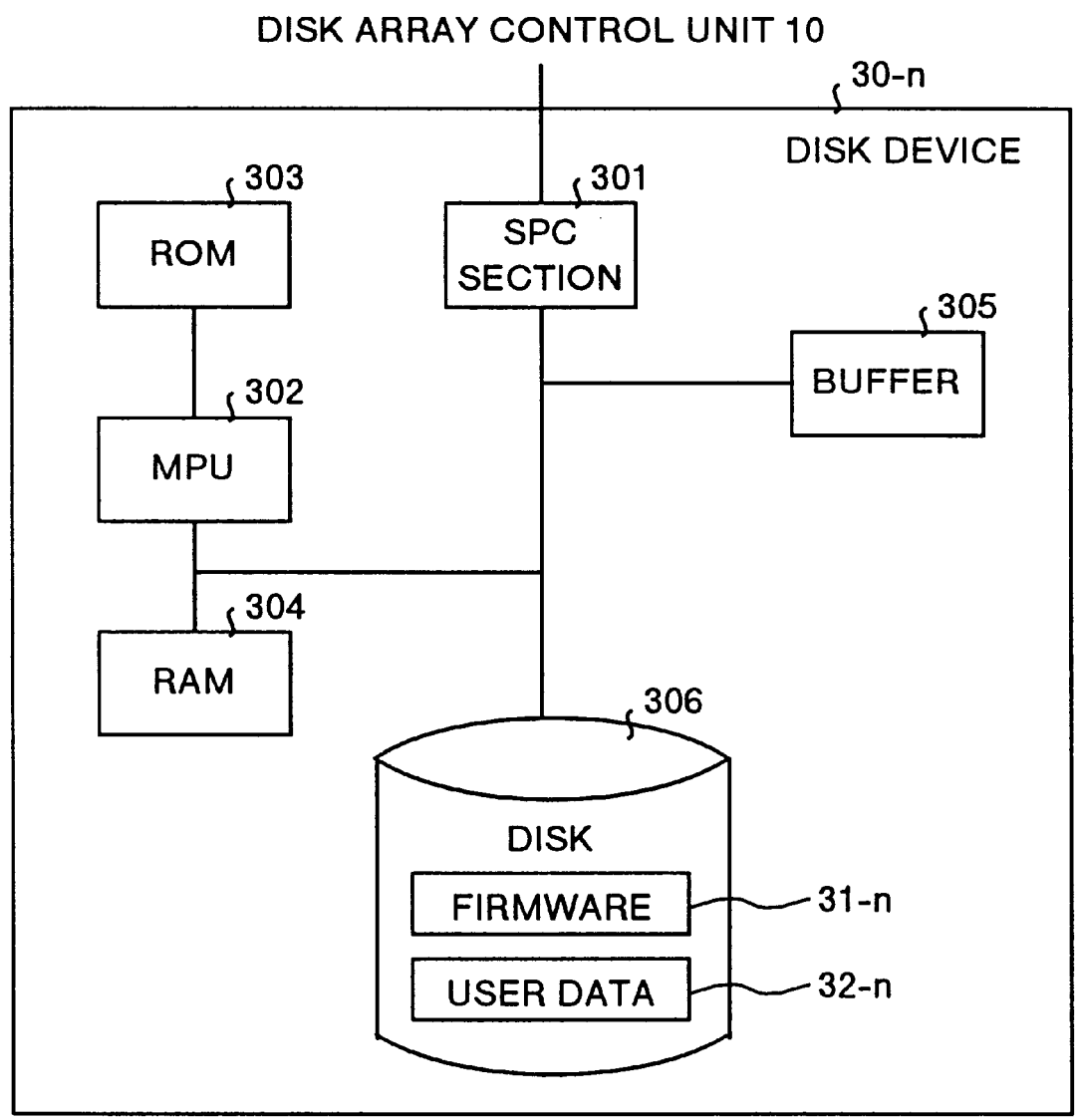
FIG. 3 is a block diagram concretely showing internal configuration of the disk device shown in FIG. 2.

Detailed description is further made for the disk device. FIG. 3 is a block diagram concretely showing internal configuration of the disk device shown in FIG. 2. FIG. 3 shows a disk device 30-n (1≦n≦m) as a representative disk device. This disk device 30-n comprises a SCSI protocol chip (SPC) section 301 connected to the disk array control device 10 (through device adapter 108-n), a MPU 302, a ROM 303, a RAM 304, a buffer 305, and a disk 306.

The reference disk selecting section 12 does not randomly select a reference disk device for selection thereof in Embodiment 1, but previously allocates two units of the disk device 30-1 and 30-2 from the smaller number of the disk numbers as reference disk devices. It should be noted that this arrangement for reference disks is not limited to the disk devices 30-1 and 30-2, but other disk numbers may be employed.

Two disk devices are allocated as reference disk devices because one disk device can be substituted as a reference disk device when the other device can not function as a reference disk device. For this reason, if the disk device 30-n shown in FIG. 3 is the disk device 30-1 or 30-2, the disk device functions as a reference disk device to a replaced disk according to the principles described above.

The SPC section 301 controls a SCSI protocol with the disk array control device 10. The MPU 302 controls reading or writing of data (firmware, user data) from or to the disk 306 according to the program stored in the ROM 303. The ROM 303 stores therein various types of programs for operating the MPU 302. The RAM 304 used as a work area for execution of the program in the MPU 303.

The buffer 305 is a memory for temporarily accumulating transfer data (firmware, user data) when data is transferred to the disk array control device 10. The disk 306 has a firmware storing area 31-n for storing therein firmware and a user-data storing area 32-n for storing therein user data. This disk 306 reads or writes data from or to an area required by the disk array control device 10 according to control by the MPU 302.

Figures 4, 5:
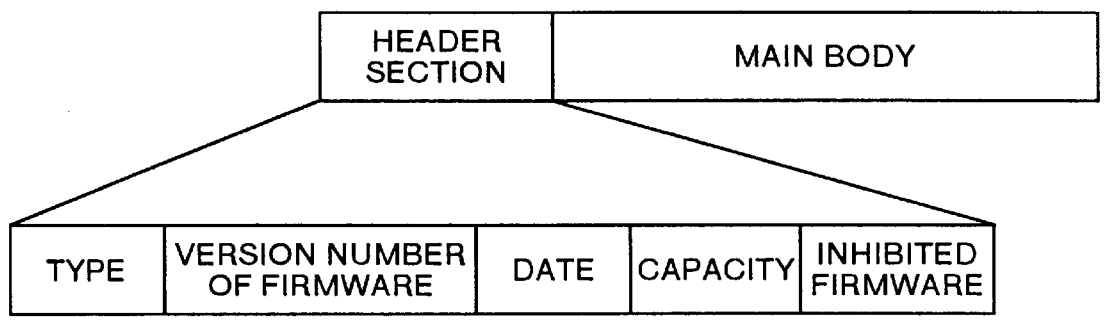
FIG. 4 is a view showing a format example of firmware.
FIG. 5 is a view showing a relation of header information among physical disks in a table form in Embodiment 1.

Next, description is made for an example for a format of firmware. FIG. 4 is a view showing a format example of firmware, and Fig. is a view showing a relation of header information among physical disks in a table form in Embodiment 1.

The format of the firmware in Embodiment 1 is divided, as shown in FIG. 4, into a header section and a main body. Recorded in the header section are a type of a format, a firmware version number, a date when the main body of the firmware is recorded, capacity of a disk and an inhibited firmware version number, and the main body of firmware is recorded in the main body thereof.

The inhibited firmware version number here indicates a firmware version number which should not be used for the disk device. A different component may be used for a disk device depending on a manufacture's lot version number or the like, and the mismatch between the hardware and firmware of the disk device may occur due to this difference between the components, which may cause contradiction in control. To prevent this contradiction in control, a firmware version number not matching with the hardware is shown as an inhibited firmware version number.

FIG. 5 shows a relation of header sections among disk devices when the disk array 30 normally operates without replacement of a disk. The same type A is employed in the disk devices 30-1 to 30-m as one example. If a different type of disk device is replaced like a type B or a type C, the different type thereof can not be incorporated in the disk, according to the header section, and can not be constructed as a logic disk for normally operating, although the system operation itself is not stopped. However, a condition that a common type of disk is provided for each of the same logical unit number (LUN) is required for returning the system to a state of normal operation thereof.

Also, concerning other header information in the disk devices 30-1 to 30-m, which are not restricted by the above condition, there are common conditions such as a firmware version number: "0003", a date: "96/10/11", capacity: "2G", and inhibited firmware: "0001".

Figure 6:
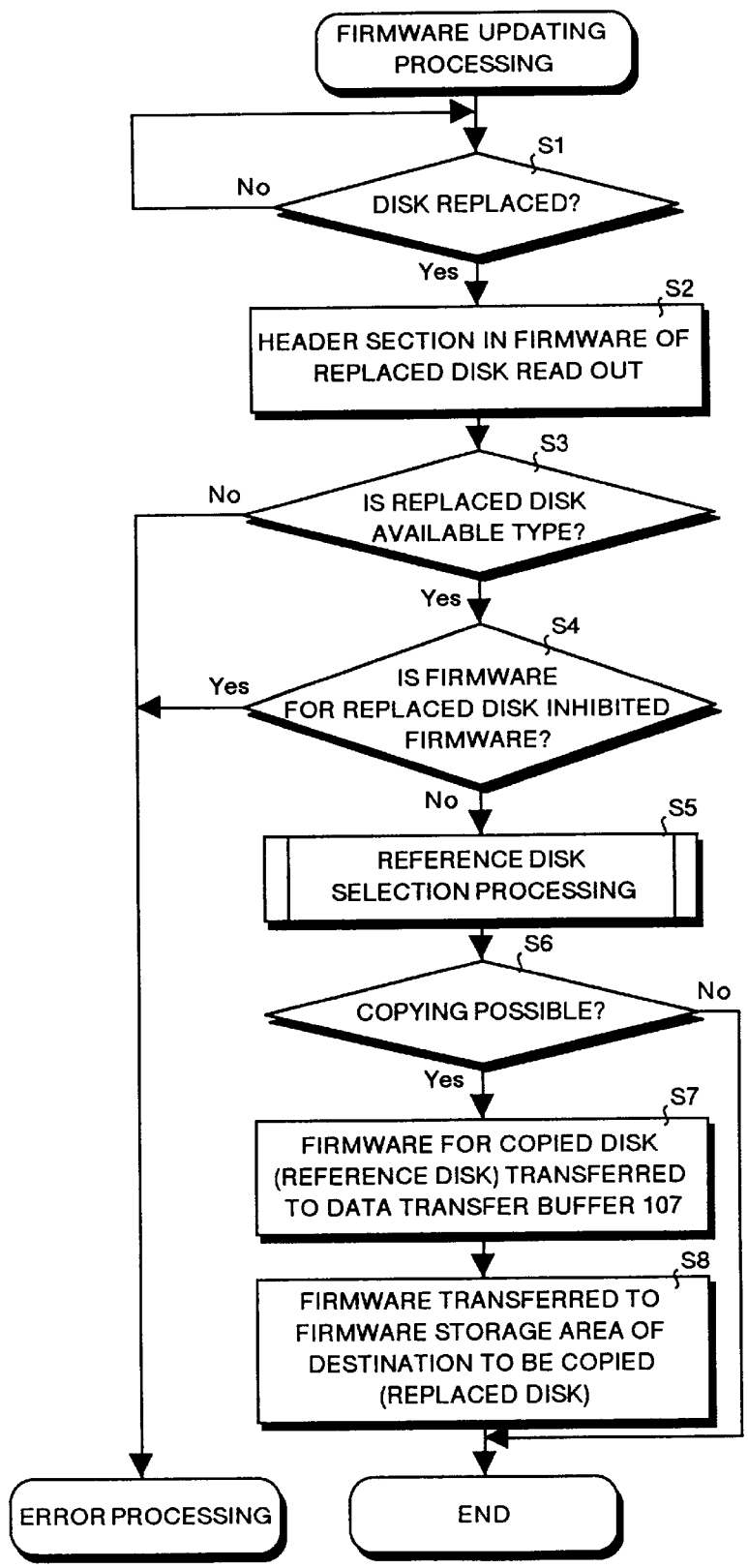
FIG. 6 is a flow chart for explaining firmware updating processing according to Embodiment 1.
Figure 7:
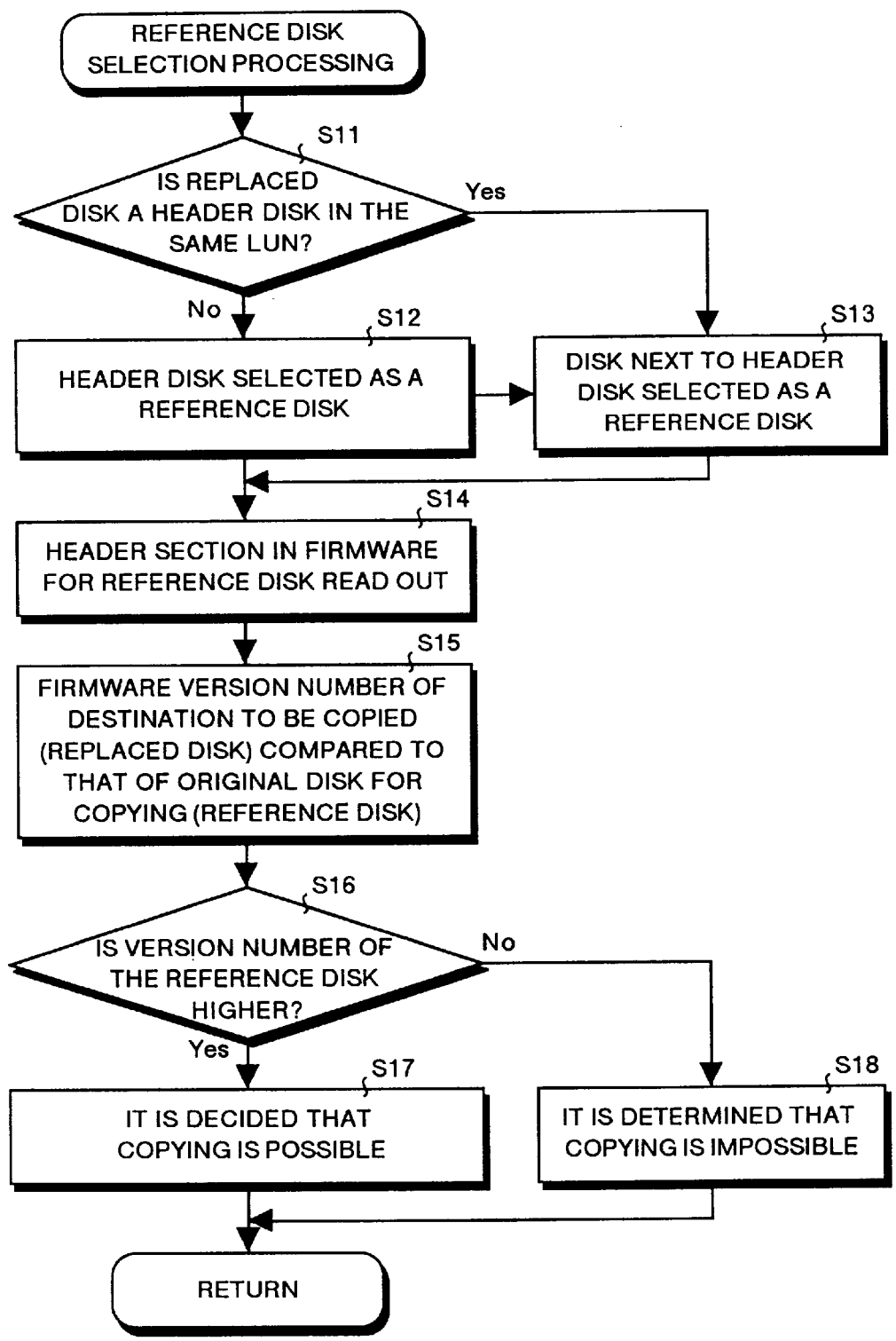
FIG. 7 is a flow chart for explaining reference disk selection according to Embodiment 1.

Next, description is made for operations. FIG. 6 is a flow chart for explaining firmware updating processing according to Embodiment 1, FIG. 7 is a flow chart for explaining reference disk selection processing according to Embodiment 1, and FIGS. 8A–8D are views each showing a type of header information for a replaced disk in Embodiment 1. Herein, description is made for the step to start with when a physical disk for the disk device 30-n has been replaced due to its failure.

At first, after a disk is replaced, when execution of the disk replacement is confirmed (step S1), header information in the header section is read out from the disk device 30-n with a disk having been replaced (step S2). Namely, information in the header section of firmware is temporarily stored in the buffer 305 from the firmware storing area 3 1-n in the disk 306, and then, the header information is stored in the RAM 104 for the disk array control device 10.

Then, to confirm the conditions described above, determination is made as to whether the type of a format is an available type A (refer to FIG. 5) or not (step S3). As a result, when the disk device 30-n employs a different type, like the type B (Refer to FIG. 8A) or type C, the processing for making a report on an error indicating that the type is different to the host computer 20 is executed through the host adapter 101. The firmware updating processing is stopped by this processing for the error.

On the other hand, when the disk device 30-n has employed the same type A, further determination is made as to whether the firmware version number of a replaced disk corresponds to the inhibited firmware "0001" shared with other disk devices by referring to the header information stored in the RAM 104 (step S4).

As a result, when the disk device 30-n employs a firmware version number "0001" corresponding to the inhibited firmware as shown in FIG. 8B, the processing for making a report on an error indicating that the replaced disk uses the inhibited firmware to the host computer 20 is executed through the host adapter 101. The firmware updating processing is stopped by this processing for the error.

Although the inhibited firmware is set here to "0002" in the header information in FIG. 8B, if the inhibited firmware is "0003", a firmware version number of another disk device corresponds to the inhibited firmware, so that the replaced disk device 30-n can not be removed. Accordingly, determination on a reversed case to the above case is also included in step S4, and the firmware updating processing is stopped with the processing for the error.

On the other hand, if it is determined in step S4 that the disk device 30-n has employed a firmware version number other than that of the inhibited firmware, the disk selection processing for selecting a reference disk device (Refer to FIG. 7) from the disk devices 30-1 to 30-m in the same LUN (disk array 30) is executed (step S5). This reference disk selection processing determines, in addition to selection of a reference disk device, that copying is allowed only to a replaced disk device employing a lower firmware version number than that of the reference disk device.

Accordingly, if it is determined in step S5 that copying is allowed, in step S6, the processing further shifts to step S7 based on a determination that the copying is allowed, but if it is determined in step S5 that copying is not allowed, in step S6, the copying operation is omitted based on a determination that the copying is not allowed, and the firmware updating processing is ended.

In step S7, firmware is read out from the firmware storing area for the reference disk device as an original disk device for copying, and the firmware is temporarily stored in the data transfer buffer 107. Then, in step S8, the firmware stored in the data transfer buffer 107 is transferred to the firmware storing area 31-n of the replaced disk device 30-n as a destination to be copied. With this storing operation, the firmware in the firmware storing area 31-n is updated with the same firmware as that for the reference disk device.

Next detailed description is made for the reference disk selection processing in step S5 with reference to FIG. 7. When the processing shifts to the reference disk selection processing, at first, determination is made as to whether a replaced disk device is a header of the same LUN, namely the disk device 30-1 (step S11). If it is determined that the replaced disk device is the disk device 30-1, the next disk device 30-2 is selected as a reference disk device (step S13), and if it is determined that the replaced disk device is not the device 30-1, the disk device 30-1 is selected as a reference disk device (step S12).

When the reference disk device is selected as described above, header information for the reference disk device is further read out (step S14), and a firmware version number is compared between a destination to be copied (disk to be replaced) and an original disk device for copying (reference disk) (step S15). For instance, if a firmware version number of a disk device to be replaced is "0002" (Refer to FIG. 8C), it is determined that the firmware version number "0002" of the destination to be copied is lower than the firmware version number "0003" of the original disk device for copying (step S16), and for this reason this case requires the copying operation. Accordingly, the processing shifts to step S17, and it is decided therein that the copying is allowed.

On the other hand, if a firmware version number of a disk device to be replaced is "0004" (Refer to FIG. 8D), it is determined that the firmware version number "0004" of the destination to be copied is higher than the firmware version number "0003" of the original disk device for copying (step S16), and for this reason this case does not require the copying operation. Accordingly, the processing shifts to step S18, and it is decided therein that the copying is not allowed. It should be noted that when the firmware version number of the original disk device for copying is equal to that of the destination to be copied, copying is regarded as a wasteful operation, so that the same processing is executed based on the decision that the copying is not allowed.

As described above, with Embodiment 1, firmware is loaded to the replaced disk 30-n even during system operation, so that, in addition to the reliability of the disk array 30, throughput of the disk array device for operation can be improved.

Also, when either one of the two disk devices (disk device 30-1) is a disk device having been replaced among the two disk devices having previously been allocated as reference disks, another disk device (disk device 30-2) is selected as a reference disk device, so that a logical disk can be maintained at any time in fixed firmware version number when the disk is replaced.

Only when the firmware version number of a disk device having been replaced is lower than that of a reference disk device (disk device 30-1 or 30-2), copying is executed, so that such a wasteful operation as copying an older version number is eliminated, and for this reason throughput of the disk array device for operation can further be improved.

The disk devices having been replaced are not always recognized as objects to be operated, so that use of any disk device having incompatible firmware that is inhibited firmware (e.g., firmware version number "0001") can be prevented before it is used, and for this reason the reliability of the disk array 30 can further be improved.

Although the original disk device for copying firmware is fixed to the header or the next disk device of the same LUN in Embodiment 1, like in Embodiment 2 described below, the firmware updating operating may be executed with a disk device having firmware in the same version number as that of the firmware before disk replacement as an original disk device for copying. It should be noted that the entire configuration of Embodiment 2 described below is the same as that of Embodiment 1, so that figures and description thereof are omitted herein.

Figure 9:
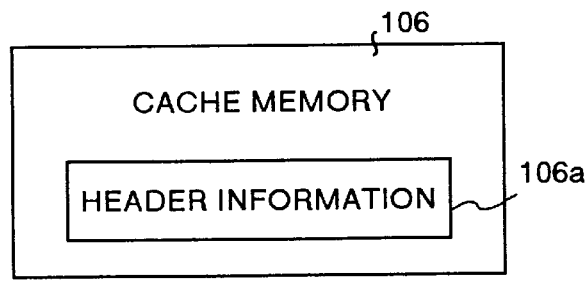
FIG. 9 is a block diagram showing a key section of the disk array device according to Embodiment 2 of the present invention.

First, a description is made for sections of the configuration different from those of Embodiment 1. FIG. 9 is a block diagram showing a key section of a disk array device according to Embodiment 2 of the present invention. A header information storing area 106a is provided in a cache memory 106 in Embodiment 2. Header information for each of the disk devices 30-1 to 30-m are previously stored in this header information storing area 106a in correlation to each other, as shown in FIG. 5.

Figure 10:
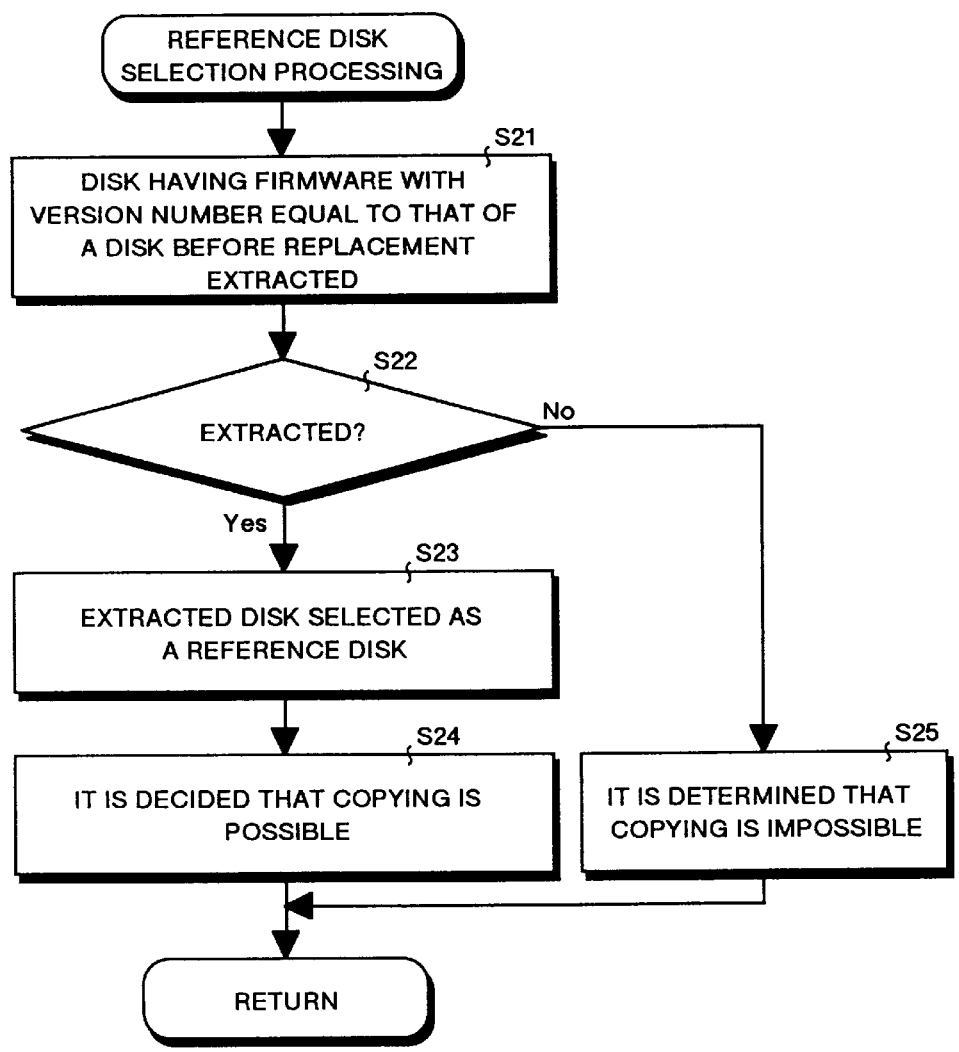
FIG. 10 is a flow chart for explaining reference disk selection processing according to Embodiment 2.

Next, a description is made for steps of the operations different from those in Embodiment 1. As for the operations of Embodiment 2, description is made herein only for reference disk selection processing because firmware updating processing here is the same as described above. FIG. 10 is a flow chart for explaining reference disk selection processing according to Embodiment 2.

In this reference disk selection processing, first, a disk device having firmware in a version number equal to the firmware version number of the disk before replacement is extracted by referring to header information stored in the header information storing area 106a (step S21). As a result, if the disk device can be extracted (step S22), the processing shifts to step S23, and the extracted disk device is selected as a reference disk device.

Although the disk device 30-1 or 30-2 is fixedly selected as a reference disk device in Embodiment 1, in Embodiment 2, firmware version numbers are matched to each other before and after disk replacement, so that any disk device satisfying the condition described above is selected as a reference disk device. When a reference disk device is selected as described above, it is determined in the following step S24 that copying is allowed, and the processing returns to the firmware updating processing and FIG. 6.

On the other hand, if any disk device can be extracted (step S22), the processing shifts to step S25, and it is determined that copying is not allowed, and then the processing returns to the firmware updating processing in FIG. 6. It should be noted that, when copying is not allowed, the processing is programmed to end as it is in the firmware updating processing in FIG. 6, but a message indicating that there is no disk device as an original disk device for copying may be reported to the host computer 20.

As described above, with Embodiment 2, header information for firmware of each of the disk devices 30-1 to 30-m is previously stored, and the firmware in the same firmware version number is loaded ti a replaced disk, by referring to the header information, so as to enable maintenance of a state of the logical disk before and after the disk replacement even during system operation, so that, in addition to the reliability of the disk array 30, throughput of the disk array device for operation can be improved.

Although the firmware updating operation is executed with a disk device having firmware in the same version number as that of the firmware before disk replacement as an original disk device for copying in Embodiment 2, like in Embodiment 3 described below, the firmware updating operation may be executed with a disk device, as an original disk device for copying, having firmware in a version number which the largest number of disk devices among disk devices having in common.

It should be noted that the entire configuration of Embodiment 3 described below is the same as that of Embodiment 1, so that figures and a description thereof as omitted herein. Also, in Embodiment 3, it is not always required to provide the header information storing area 106a in the cache memory 106 like that in Embodiment 2.

Figure 11:
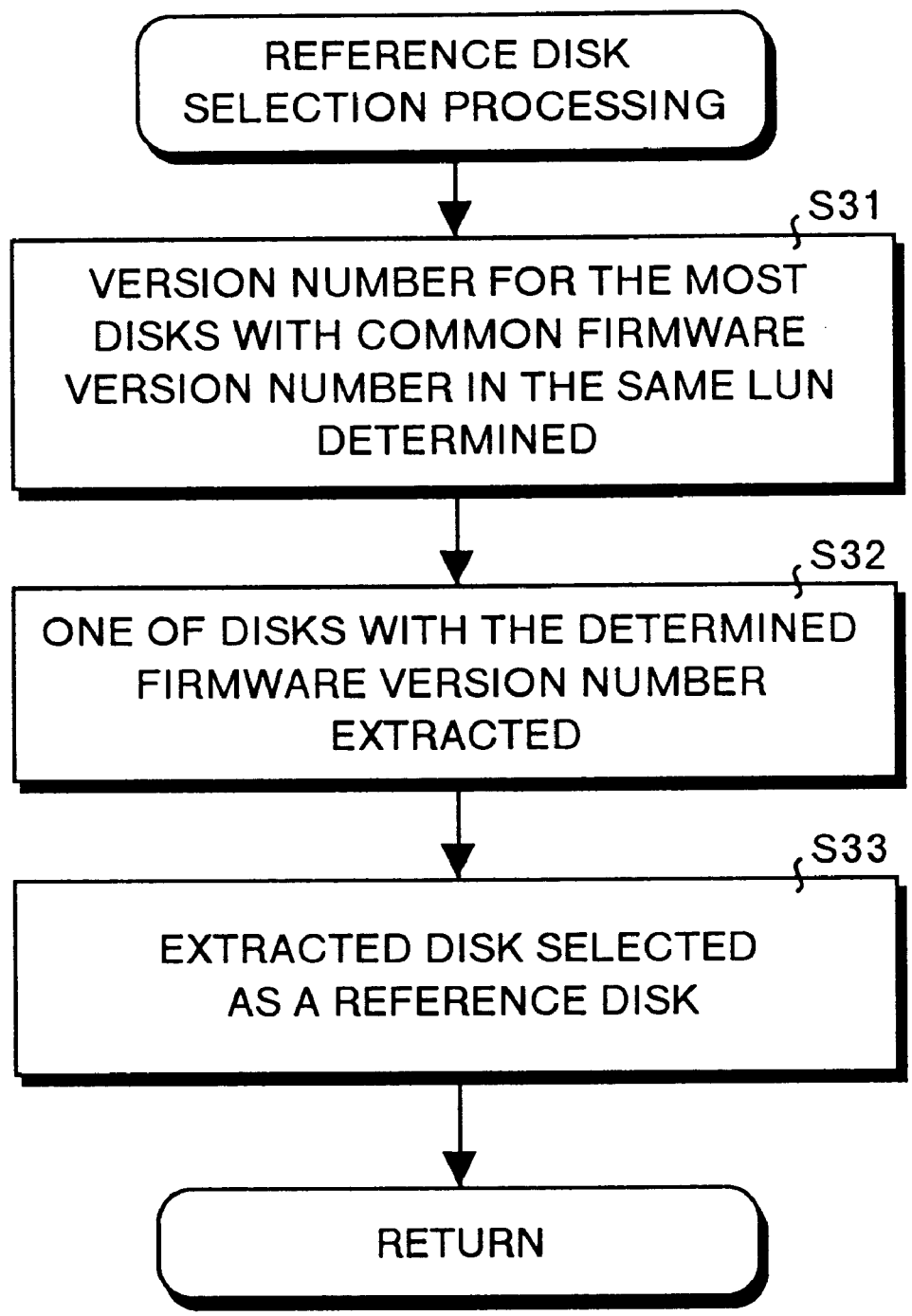
FIG. 11 is a flow chart for explaining reference disk selection processing according to Embodiment 3 of the present invention.

Next, a description is made for steps of the operations different from those in Embodiment 1. As for the operations in Embodiment 3, description is made herein only for reference disk selection processing because firmware updating processing here is the same as described above. FIG. 11 is a flow chart for explaining reference disk selection processing according to Embodiment 3.

In this reference disk selection processing, first, access is made to the firmware storing areas 31-1 to 31-m in the disk devices 30-1 to 30-m, and determination is made by referring to header information therein, which is a firmware version number, that the largest number of disk devices have in common in the same LUN (step S31). A disk device having the firmware in the version number extracted as described above is extracted from the disk array 30 (step S32). The extracted disk device is selected as a reference disk device (step S33).

Then, although the processing returns to the firmware updating processing in FIG. 6, determination as to whether copying is allowed or not in step S6 is omitted in the firmware updating processing because determination is not made in this reference disk selection processing (Refer to FIG. 11) as to whether copying is allowed.

As described above, with Embodiment 3, the firmware in the most common version number is loaded to a replaced disk so as to suppress the possibility of causing logical contradiction on the logical disk after disk replacement even during system operation, so that, in addition to the reliability of the disk array 30, throughput of the disk array device for operation can be improved.

Although header information is previously stored like in Embodiment 2, a method of not referring to the header information is employed for selection of a reference disk in Embodiment 3, but the header information storing area 106a may be provided in the cache memory 106 and employ a method of referring to the header information also in Embodiment 3.

Also, in the reference disk selection processing, it is not mentioned whether a firmware version number of a replaced disk is included in determination as to whether the firmware version number is one which the largest number of disk devices have in common, but either of the cases may be effected.

As for selection of a reference disk, like in Embodiment 4 described below, firmware updating processing may be executed with a disk device having the highest firmware version number as an original disk device for copying, as one of the variations different from those of Embodiments 2 and 3.

It should be noted that the entire configuration of Embodiment 4 described below is the same as that of Embodiment 1, so that figures and a description thereof are omitted herein. Also, in Embodiment 4, it is not always required to provide the header information storing area 106a in the cache memory 106 like that in Embodiment 2.

Figure 12:
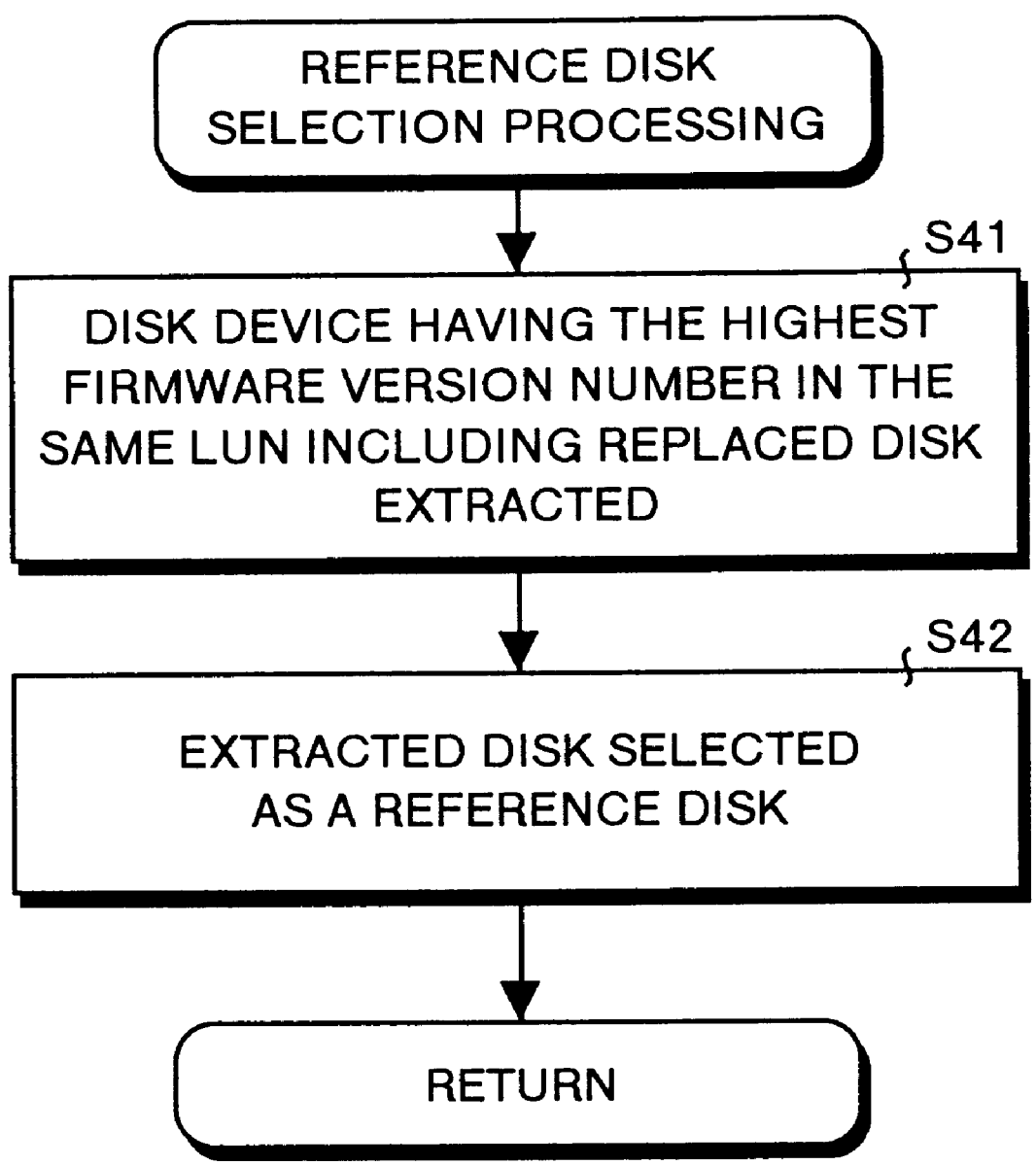
FIG. 12 is a flow chart for explaining reference disk selection processing according to Embodiment 4 of the present invention.

Next, a description is made for steps of the operations different from those of Embodiment 1. As for the operations in Embodiment 4, description is made herein only for reference disk selection processing because firmware updating processing here is the same as described above. FIG. 12 is a flow chart for explaining reference disk selection processing according to Embodiment 4.

In this reference disk selection processing, first, access is made to the firmware storing areas 31-1 to 31-m in the disk devices 30-1 to 30-m, and a disk device having firmware in the highest firmware version number is extracted from the disk array 30 in the same LUN (including a replaced disk) by referring to header information therein (step S41). The extracted disk device is selected as a reference disk device (step S42).

Then, although the processing returns to the firmware updating processing in FIG. 6, determination as to whether copying is allowed in step S6 is omitted in the firmware updating processing because determination is not made in this reference disk selection processing (Refer to FIG. 12) as to whether copying is allowed.

As described above, with Embodiment 4, the firmware in the highest version number is loaded to a replaced disk so as not to generate logical contradiction due to differences of the firmware version number on the logical disk even during system operation, so that, in addition to the reliability of the disk array 30, throughput of the disk array device for operation can be improved.

As for selection of a reference disk, like in Embodiment 5 described below, firmware operating processing may be executed with a disk device having the latest date when firmware is loaded therein as an original disk device for copying, as one of the variations different from those of Embodiments 2, 3 and 4.

It should be noted that the entire configuration of Embodiment 5 described below is the same as that of Embodiment 1, so that figures and a description thereof are omitted herein. Also, in Embodiment 5, it is not always required to provide the header information storing area 106a in the cache memory 106 like that in Embodiment 2.

Figure 13:
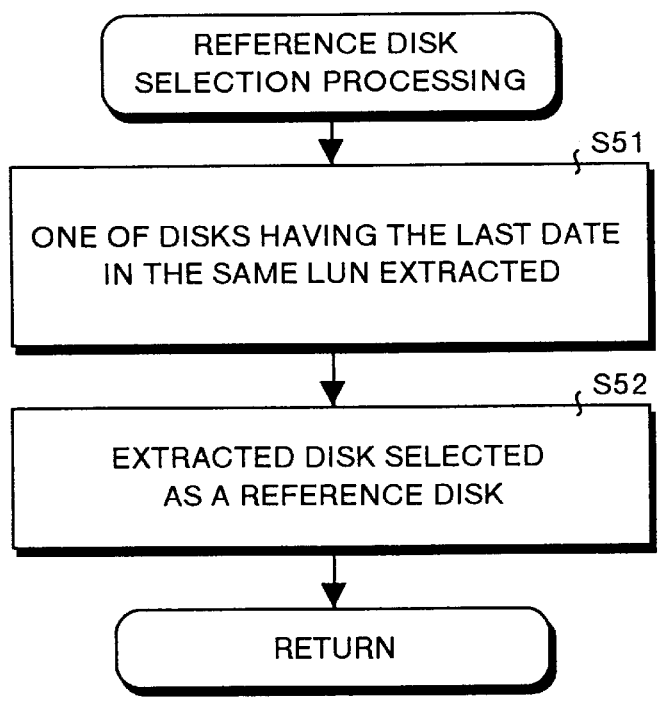
FIG. 13 is a flow chart for explaining reference disk selection processing according to Embodiment 5 of the present invention.

Next, a description is made for steps of the operations different from those of Embodiment 1. As for the operations of Embodiment 5, description is made herein only for reference disk selection processing because firmware updating processing here is the same as described above. FIG. 13 is a flow chart for explaining reference disk selection processing according to Embodiment 5.

In this reference disk selection processing, first, access is made to the firmware storing areas 31-1 to 31-m in the disk devices 30-1 to 30-m, and one unit of the disk devices having the latest date when the firmware is loaded therein is extracted from the disk array 30 in the same LUN (not including a replaced disk) by referring to header information therein (step S51). The extracted disk device is selected as a reference disk device (step S52).

Then, although the processing returns to the firmware updating processing in FIG. 6, determination as to whether copying is allowed in step S6 is omitted in the firmware updating processing because determination is not made in this reference disk selection processing (Refer to FIG. 13) as to whether copying is allowed.

As described above, with Embodiment 5, the firmware stored on the latest date is loaded to a replaced disk so as not to generate logical contradiction due to an earlier date on the logical disk even during system operation, so that, in addition to the reliability of the disk array 30, throughput of the disk array device for operation can be improved.

As for selection of a reference disk, like in Embodiment 6 described below, firmware updating processing may be executed, not depending on a firmware version number or date, but depending on a disk device adjacent to a replaced disk device as an original disk device for copying, as one of the variations different from those of Embodiments 2 to 5.

It should be noted that the entire configuration of Embodiment 6 described below is the same as that of Embodiment 1, so that figures and a description thereof are omitted herein. Also, in Embodiment 6, it is not always required to provide the header information storing area 106a in the cache memory 106 like that in Embodiment 2.

Figure 14:
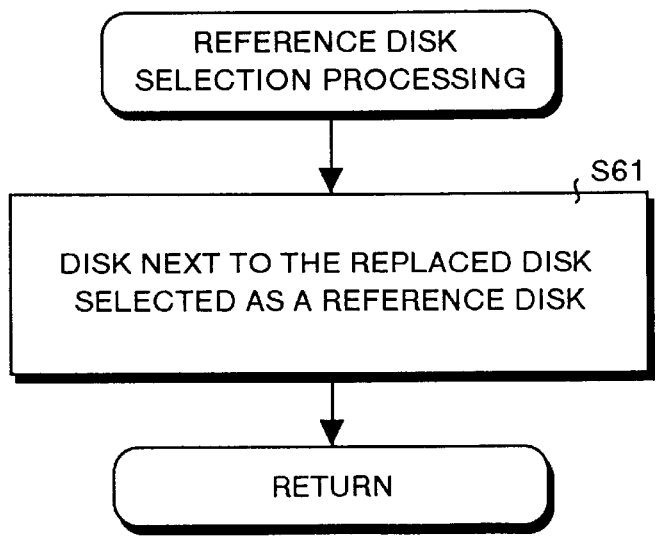
FIG. 14 is a flow chart for explaining reference disk selection processing according to Embodiment 6 of the present invention.

Next, a description is made for steps of the operations different from those of Embodiment 1. As for the operations in Embodiment 6, description is made herein only for reference disk selection processing because firmware updating processing here is the same as described above. FIG. 14 is a flow chart for explaining reference disk selection processing according to Embodiment 6.

In this reference disk selection processing, a disk device connected to either one of forward- and backward-provided disk devices of a replaced disk device is selected from the disk array 30 as a reference disk device (step S61).

Then, although the processing returns to the firmware updating processing in FIG. 6, determination as to whether copying is allowed in step S6 is omitted in the firmware updating processing because determination is not made in this reference disk selection processing (Refer to FIG. 14) as to whether copying is allowed.

As described above, with Embodiment 6, the firmware of the adjacent disk device is loaded to a replaced disk so that a disk device for maintenance is not fixed thereto even during system operation, so that, in addition to the reliability of the disk array 30, throughput of the disk array device for operation can be improved.

Although there has been employed a method of selecting a reference disk device from any disk devices of the disk array 30 in Embodiments 1 to 6, like in Embodiment 7 described below, a spare disk device is incorporated in the same LUN and firmware updating may be executed with firmware of the spare disk device. It should be noted that the entire configuration of Embodiment 7 described below is the same as that of Embodiment 1, so that figures and a description thereof are omitted herein.

Figure 15:
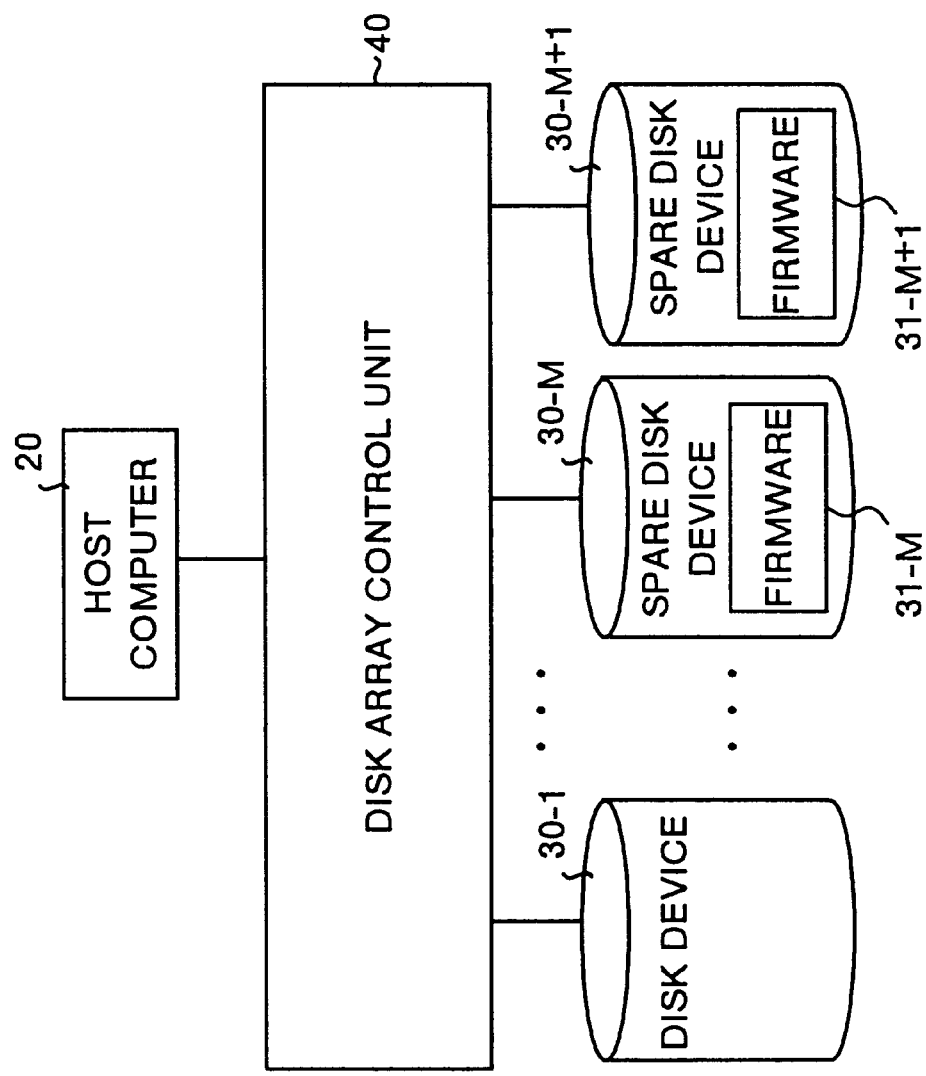
FIG. 15 is a block diagram showing an example of hardware configuration of the disk array device according to Embodiment 7 of the present invention.

First, a description is made of the configuration. FIG. 15 is a block diagram showing an example of the hardware configuration of a disk array device according to Embodiment 7 of the present invention. The disk array device shown in FIG. 15 comprises a disk array control device 40 and a disk array comprising devices 30-1 . . . , and spare disk devices 30-M and 30-M+1.

The disk array control device 40 has the same internal configuration as a whole as that of the disk array device 10, but the configuration differs in that a device adapter (not shown) for interfacing between an application and the spare disk devices 30-M and 30-M+1 is added to the above configuration.

Two units of spare disk devices 30-M and 30-M+1 are provided in Embodiment 7 as an example. The spare disk devices 3O-M and 30-M+1 have firmware storing areas 31-M and 31-M+1 provided in the disks respectively because each of the devices supples firmware as an original disk device for copying, in addition to functioning as an ordinary spare disk.

Figure 16:
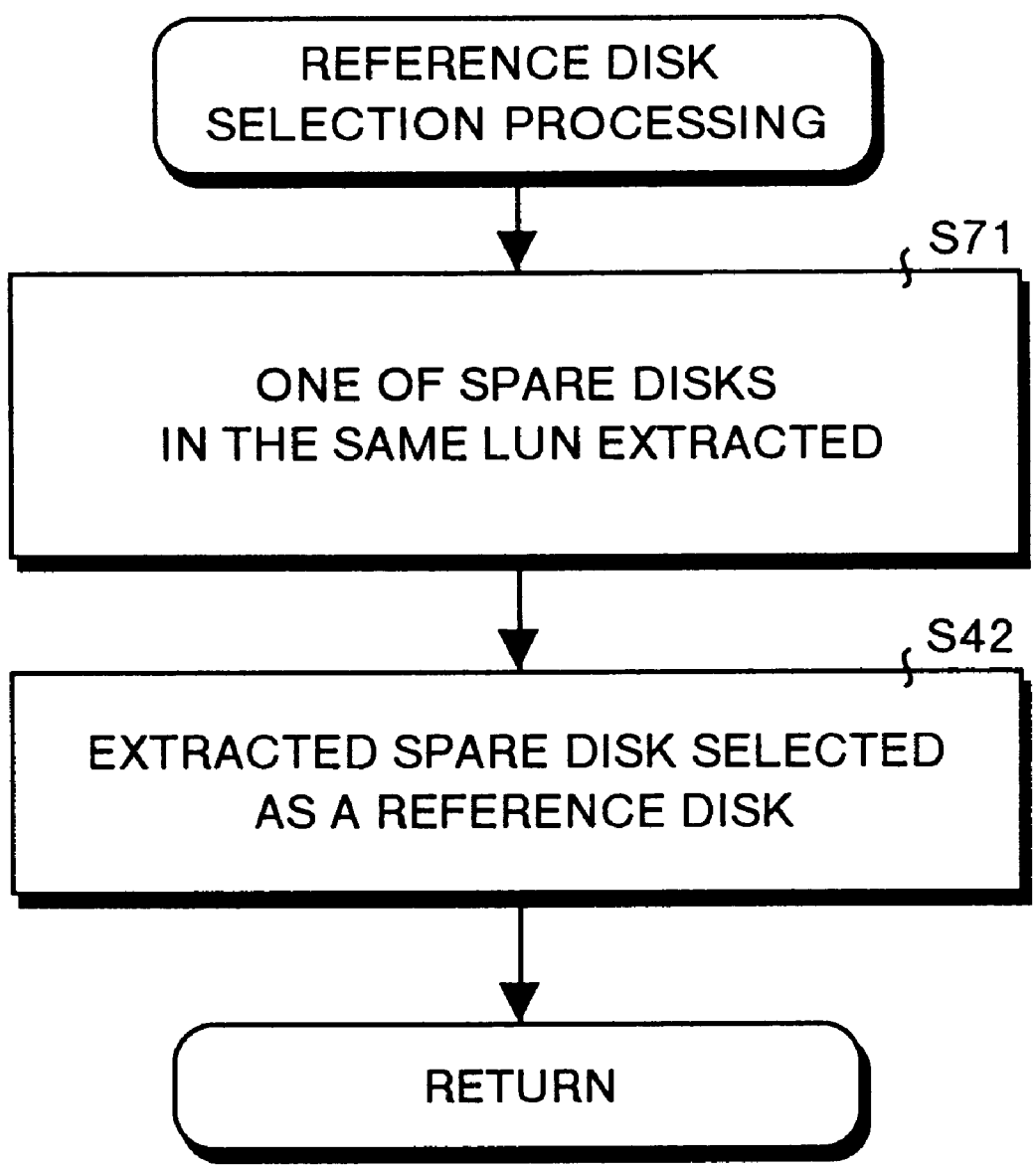
FIG. 16 is a flow chart for explaining reference disk selection processing according to Embodiment 7 of the present invention.

Next, a description is made for steps of the operations different from those of Embodiment 1. As for the operations in Embodiment 7, description is made herein only for reference disk selection processing because firmware updating processing here is the same as described above. FIG. 16 is a flow chart for explaining reference disk selection processing according to Embodiment 7 of the present invention.

In this reference disk selection processing, an arbitrary unit of the spare disk devices is extracted from the spare disk devices 30-M and 30-M+1 (steps S71), and the extracted spare disk device is selected as a reference disk device (step S72). It should be noted that the method employed in Embodiments 2 to 6 may be applied for extraction in step S71.

Then, although the processing returns to the firmware updating processing in FIG. 6, determination as to whether copying is allowed in step S6 is omitted in the firmware updating processing because determination is not made in this reference disk selection processing (Refer to FIG. 16) whether copying is allowed.

As described above, with Embodiment 7, a spare disk device is applied, and the firmware with which a physical disk can be maintained at any time according to the fixed firmware version number thereof is loaded to a replaced disk even during system operation, so that, in addition to the reliability of the disk array, throughput of the disk array device for operation can be improved.

Although there have been employed a method of selecting a reference disk device for updating firmware in Embodiments 1 to 7, like in Embodiment 8 described below, a method of selecting reference firmware from a plurality of types of firmware previously prepared for updating firmware my be employed. It should be noted that the entire hardware configuration of Embodiment 8 described below is the same as that of Embodiment 1, so that figures and a description thereof are omitted herein.

Figure 17:
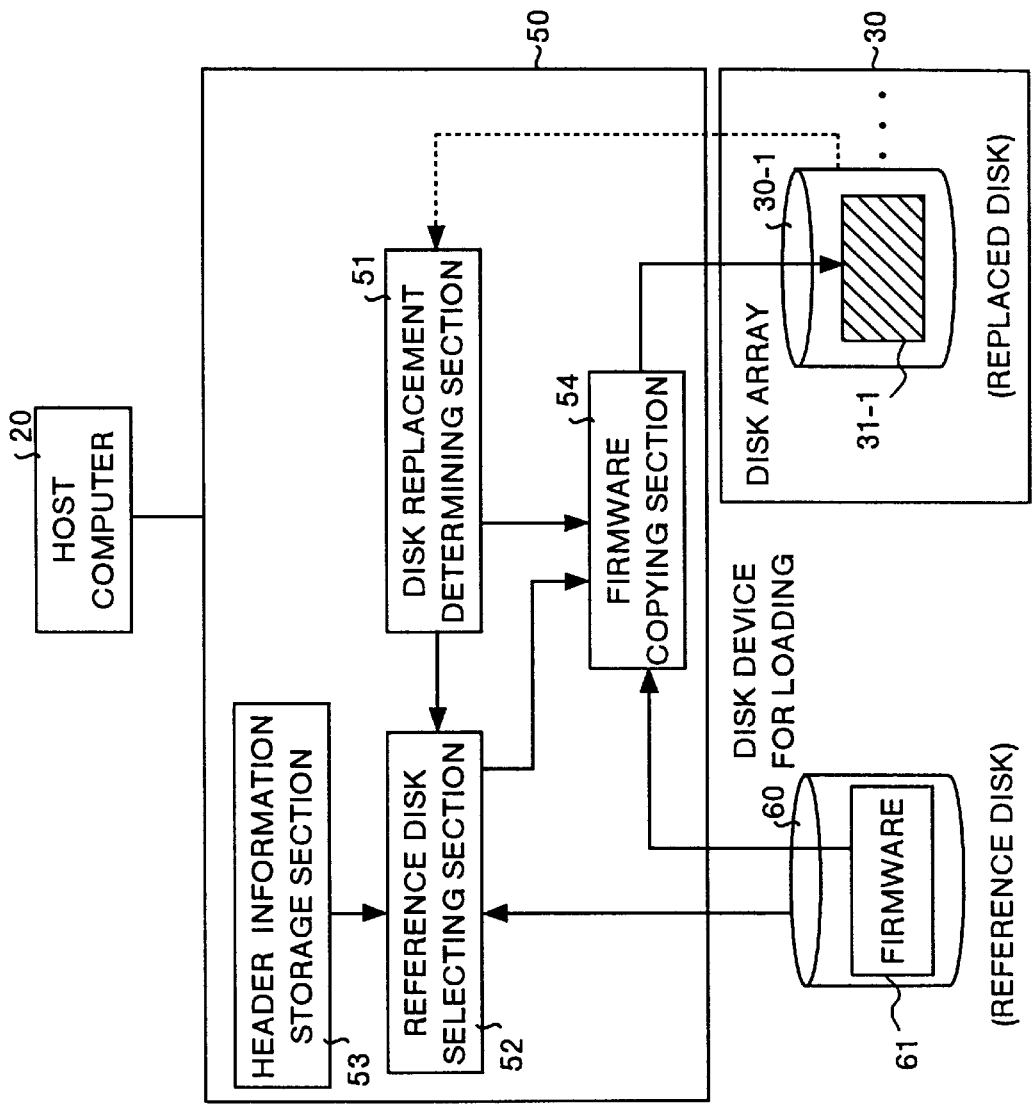
FIG. 17 is a block diagram showing principles of the disk array device according to Embodiment 8 of the present invention.

First, a description is made of the principles. FIG. 17 is a block diagram showing principles of a disk array device according to Embodiment 8 of the present invention. The disk array device shown in FIG. 17 comprises a disk array 30 comprising a plurality of disk device 30-1 . . . , each storing therein data transferred from the host computer 20 as an upper device, a disk array control device 50 with a plurality of disk devices 30-1 . . . connected to each other in parallel for controlling data transfer between the host computer 20 and each of the devices 30-1 . . . , and a disk device for loading 60 for storing therein data transferred from the host computer 20 as an upper device with a plurality of types of firmware stored therein. It should be noted that the host computer 20 instructs the disk array control device 50 to write and read data in and from the device.

The disk array control device 50 comprises a disk replacement determining section 51, a reference firmware selecting section 52, a header information storing section 53 and a firmware copying section 54. The disk replacement determining section 51 determines, when any disk device in the disk array 30 is replaced due to its failure or the like, whether the replacement is actually preformed or not.

The reference firmware selecting section 52 selects, when it is determined by the disk replacement determining section 51 that the replacement has been performed, firmware (reference firmware) as a reference from the disk device for loading 60 for forming a physical disk from the disk devices 30-1 . . . constituting the disk array 30. The header information storing section 53 previously reads out header information for each of the disk devices 30-1 to 30-m in the disk array 30 and stores therein the read out information.

The firmware copying section 54 realizes, when it is determined by the disk replacement determining section 51 that the replacement has been performed, copying of firmware between disk devices by reading out the reference firmware selected by the reference firmware selecting section 52 from the disk device for loading 60 and writing (loading) the firmware in the disk device with a disk having been replaced.

With the configuration described above, when it is determined by the disk replacement determining section 51 during system operation that any disk has been replaced, firmware equal to that of the disk device before replacement of the disk is selected by the reference firmware selecting section 52. Then the firmware (disk device for loading 60) selected by the firmware copying section 54 is copied into a disk device with a disk having been replaced in the disk array 30.

Figure 18:
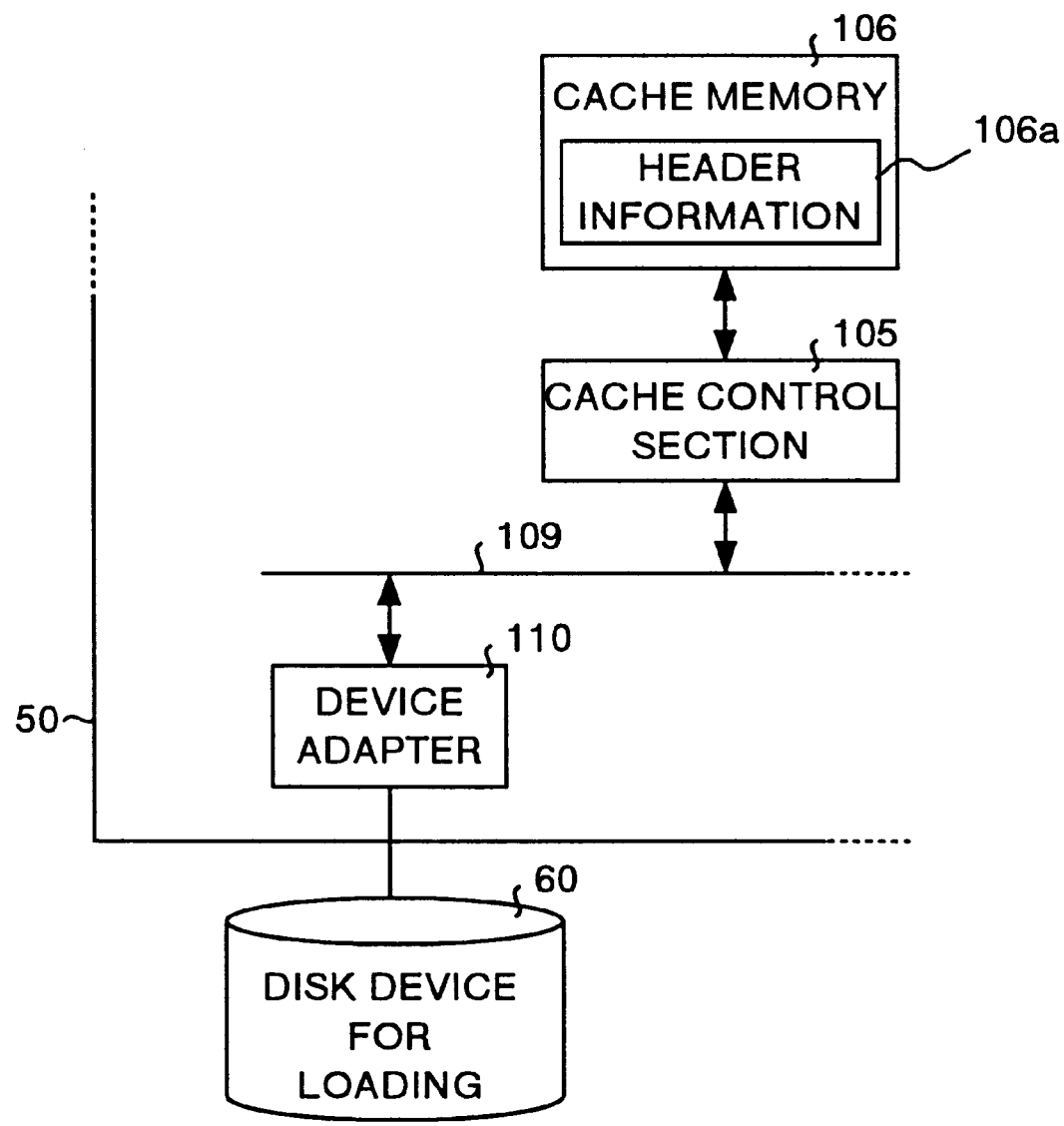
FIG. 18 is a block diagram showing a key section of the disk array device according to Embodiment 8 of the present invention.

Next, a description is made for a case where the functional blocks are realized as hardware. Description is made only for sections differing from the configuration in FIG. 2. FIG. 18 is a block diagram showing a key section of the disk array device according to Embodiment 8 of the present invention. The disk array control device according to Embodiment 8, as shown in FIG. 18, a header information storing area 106a provided in the cache memory 106 like in Embodiment 2, and a device adapter 110 for the disk device for loading 60 connected to an internal bus 109.

It should be noted that, from the viewpoint of hardware thereof, a MPU 102 is a unit for realizing functions of the disk replacement determining section 51, reference firmware selecting section 52, header information storing section 53 and firmware copying section 54, each based on the principles described above (refer to FIG. 17). The operations of the MPU 102 follow the application (stored in the RAM 104) for realizing the principles described above.

Next, a description is made for firmware stored in the disk device for loading 60, namely, information concerning loading. FIG. 19 is a view for explaining information on loading of the disk device for loading according to Embodiment 8. The loading information has a configuration, as shown in FIG. 19, in which main bodies of firmware are stored in correlation between a type of disk device and firmware version numbers.

In the example of FIG. 19, there are two types, A and B, and four types of firmware version number, 0001 to 0004. In type A, main bodies of firmware FWA1, FWA2, FWA3, and FWA4 are correlated to the firmware version numbers "0001", "0002", "0003", and "0004", respectively. In type B, main bodies of firmware FWB1, FWB2, FWB3, and FWB4 are correlated to the firmware version numbers "0001", "0002", "0003", and "0004", respectively.

Figure 20:
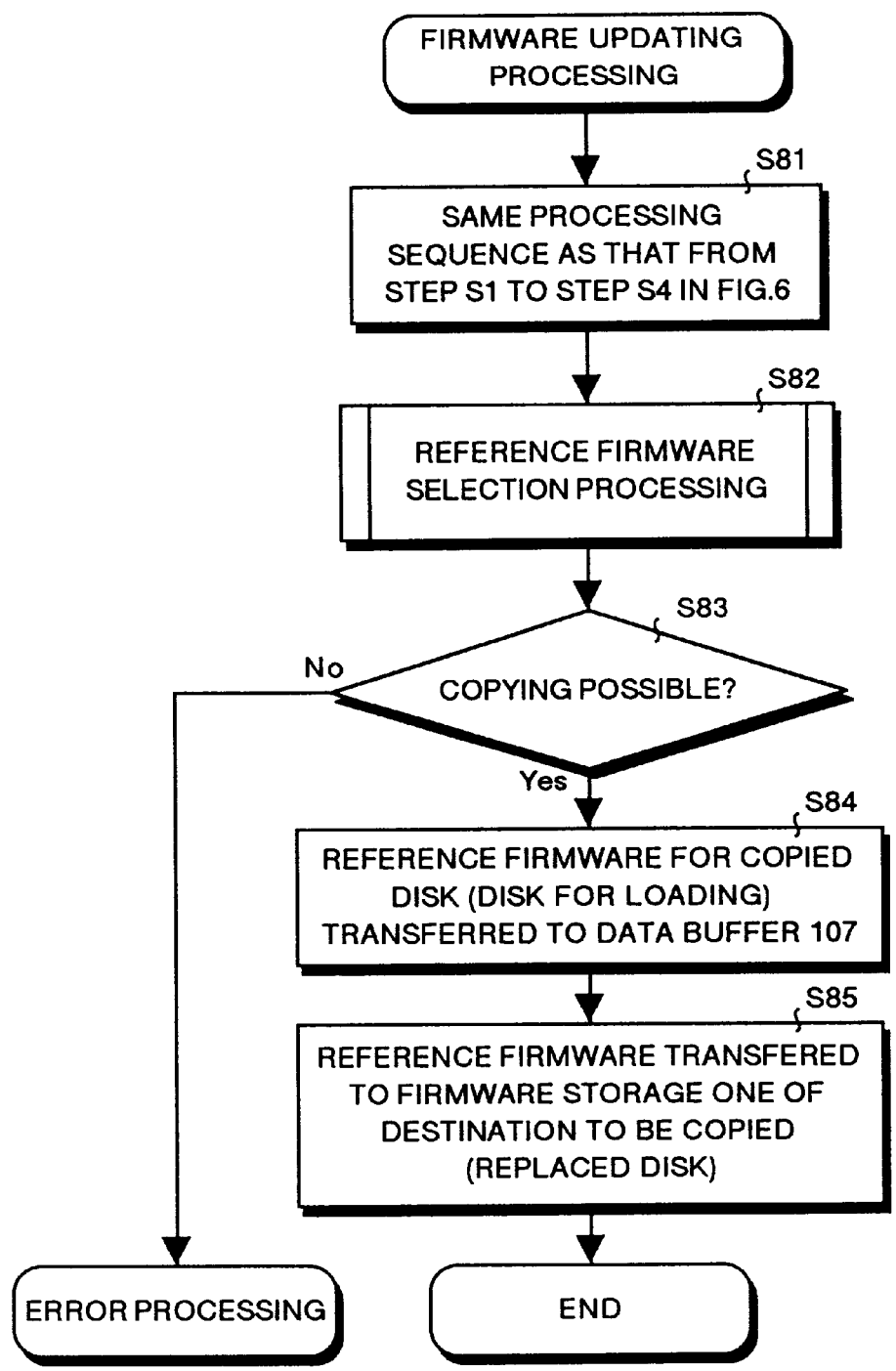
FIG. 20 is a flow chart for explaining firmware updating processing according to Embodiment 8.
Figure 21:
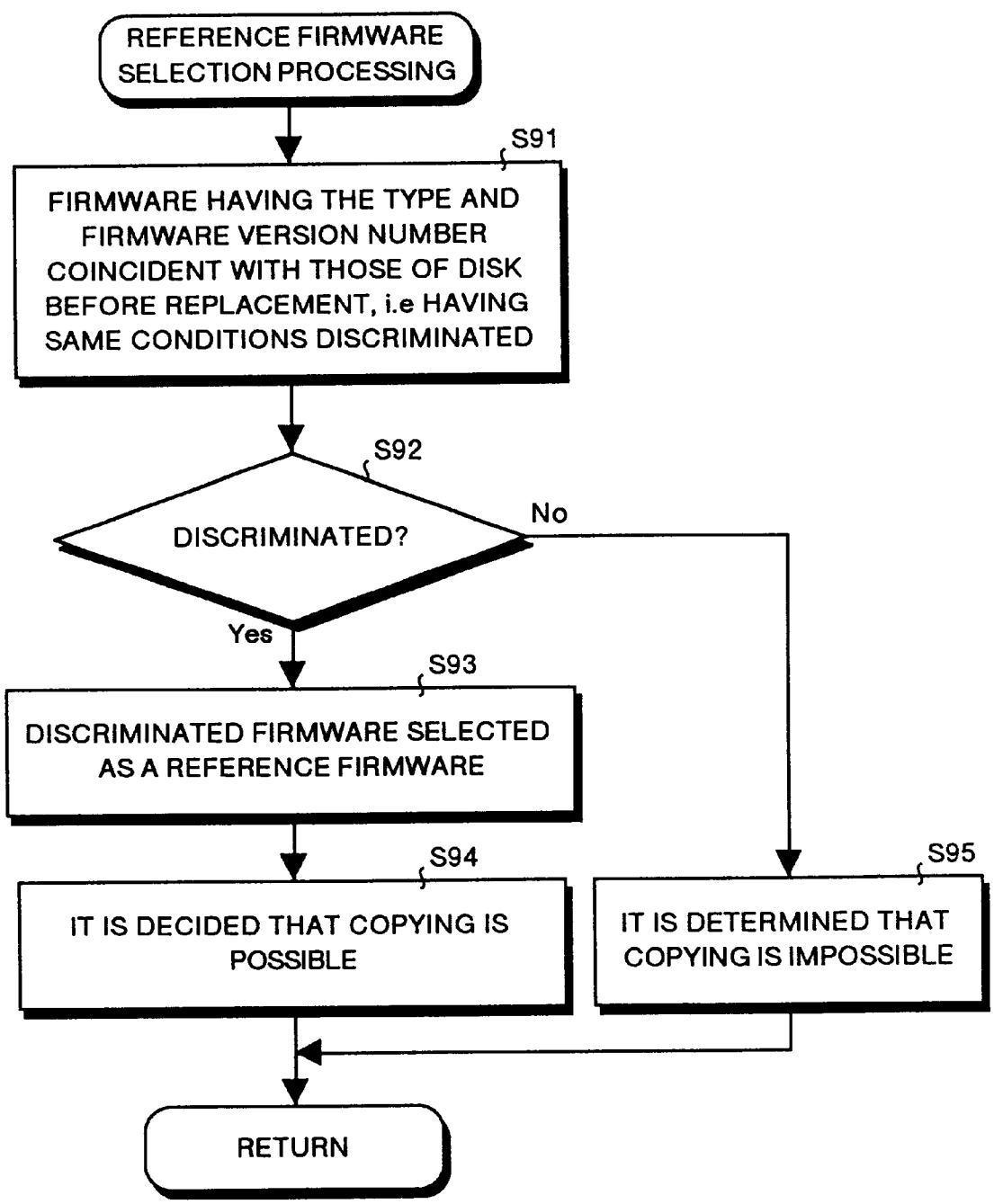
FIG. 21 is a flow chart for explaining reference disk selection processing according to Embodiment 8.

Next, a description is made for the operations. FIG. 20 is a flow chart for explaining firmware updating processing according to Embodiment 8, and FIG. 21 is a flow chart for explaining reference disk selection processing according to Embodiment 8, and FIG. 21 is a flow chart for explaining reference disk selection processing according to Embodiment 8. In Embodiment 8, similarly to Embodiment 1, the processing from step S1 to step S4 (step S81 in FIG. 20) (Refer to FIG. 6) is common and the processing after step S5 and on in FIG. 6 is different from that of Embodiment 8.

In Embodiment 8, processing for selecting a reference firmware (Refer to FIG. 21) is executed in step S82 following step S81. Determination is made also in this reference firmware selection processing as to whether copying is allowed like in the reference disk selection processing described above. If it is determined that copying is allowed (step S83), the reference firmware of the disk device for loading 60 as an original disk device for copying is transferred to the data transfer buffer 107 in step S84, and the reference firmware is further transferred to a firmware storing area of a replaced disk device as a destination to be copied in step S85.

Next, a detailed description is made for the reference firmware selection processing in step 82 of FIG. 20 with reference to FIG. 21. When the processing shifts to the processing for selecting reference firmware, first, header information stored in the header information storing are 106a of the cache memory 106 is referred to in stop S91, and firmware having the type and firmware version number coincident with those of a disk device before replacement of the disk, namely, having the same condition, is discriminated in the information concerning loading.

As a result, if discrimination of firmware can be made from the loading information (step S92), the processing shifts to step S93, and the discriminated firmware is selected as reference firmware. It is decided that copying is allowed in step S94. On the other hand, if discrimination of firmware can not be made from the loading information (step S92), the processing shifts to step S95, and it is decided therein that copying is not allowed. The processing returns to the firmware updating processing in FIG. 20 according to the decision that copying is allowed or copying is not allowed as described above.

As described above, with Embodiment 8, firmware with which a state of the logical disk can be maintained before and after the disk replacement is loaded to a replaced disk even during system operation by applying the disk device for loading 60 provided for maintenance, so that, in addition to the reliability of the disk array 30, throughput of the disk array device for operation can be improved.

Conventionally, as maintenance has been targeted for all the physical disks, wasteful revision has been executed to any physical disk not requiring revision, and on the other hand, the system has been stopped from operating to execute a revision work only for one unit of the physical disks having a different firmware version number. For this reason, throughput of a system has been reduced based on the conventional technology due to wasteful loading operations for firmware or operational loss because of a pause of the system, but with the present invention, the reliability of a disk array device can be improved.

With the present invention, firmware can further be updated to a replaced disk even during system operation, so that a time for maintenance is not required, and for this reason, convenience of the device can be improved.

This application is based on Japanese patent application No. HEI 9-299209 filed in the Japanese Patent Office on Oct. 30, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk array device comprising:
   a logical disk consisting of an I/O device for storing data therein and an I/O device for storing therein redundant data prepared with the data;
   a lower device interface control section connected to a plurality of I/O devices constituting said logical disk for transferring data to and from the I/O devices;
   an upper device interface control section connected to an upper device as well as to said lower device interface control section for analyzing an operational instruction to said logical disk issued from said upper device and also for transferring data to and from said lower device interface control section; and
   a control unit for controlling said lower device interface control section and said upper device interface control section, wherein each of the I/O devices has a rewritable nonvolatile storage medium with a control program controlling the device itself and a version number of the control program stored therein, wherein said control unit comprises:
      a detecting unit for detecting that any of the plurality of I/O devices has been replaced, and
      a copying unit for transferring to a replaced I/O device detected by said detecting unit, the control program from a non-replaced one of the plurality of I/O devices.

2. A disk array device comprising:
   a logical disk consisting of an I/O device for storing data therein and an I/O device for storing therein redundant data prepared with the data;
   a lower device interface control section connected to a plurality of I/O devices constituting said logical disk for transferring data to and from the I/O devices;
   an upper device interface control section connected to an upper device as well as to said lower device interface control section for analyzing an operational instruction to said logical disk issued from said upper device and also for transferring data to and from said lower device interface control section; and
   a control unit for controlling said lower device interface control section and said upper device interface control section, wherein each of the I/O devices has a rewritable nonvolatile storage medium with a control program controlling the device itself and a version number of the control program stored therein, wherein said control unit comprises:
      a detecting unit for detecting that any of the plurality of I/O devices has been replaced,
      a reference device selecting unit for selecting, when it is detected by said detecting unit that any of the I/O devices has been replaced, an I/O device from the plurality of I/O devices other than the replaced I/O device, and
      a copying unit for transferring and storing the control program stored in the I/O device selected by said reference device selecting unit in the replaced I/O device.

3. A disk array device according to claim 2, wherein, when the replaced I/O device has inhibited firmware, a copying operation by said copying unit is stopped based on the recognition that an error has occurred.

4. A disk array device according to claim 2, wherein said reference disk selecting unit previously allocates at least two disk devices among the plurality of disk devices as reference disks and selects, when either one of the two disk devices is a replaced disk device, another disk device as a reference disk device.

5. A disk array device according to claim 4, wherein, when the replaced disk device has inhibited firmware, a copying operation by said copying unit is stopped based on the recognition that an error has occurred.

6. A disk array device comprising:
   a logical disk consisting of an I/O device for storing data therein and an I/O device for storing therein redundant data prepared with the data;
   a lower device interface control section connected to a plurality of I/O devices constituting said logical disk for transferring data to and from the I/O devices;
   an upper device interface control section connected to an upper device as well as to said lower device interface control section for analyzing an operational instruction to said logical disk issued from said upper device and also for transferring data to and from said lower device interface control section; and
   a control unit for controlling said lower device interface control section and said upper device interface control section, wherein each of the I/O devices has a rewritable nonvolatile storage medium with a control program controlling the device itself and a version number of the control program stored therein, wherein said control unit comprises:
  a storing unit for previously storing therein header information such as the version number of the control program in correlation to each of the I/O devices,
  a detecting unit for detecting that any of the plurality of I/O devices has been replaced,
  a reference device selecting unit for selecting, when it is detected by said detecting unit that any of the I/O devices has been replaced, an I/O device having a control program version number equal to a control program version number of an I/O device that is being replaced by the replaced I/O device, said selecting performed by referring to the header information stored in said storing unit, and
  a copying unit for transferring and storing the control program stored in the I/O device selected by said reference device selecting unit in the replaced I/O device.

7. A disk array device according to claim 6, wherein, when the replaced I/O device has inhibited firmware, a copying operation by said copying unit is stopped based on the recognition that an error has occurred.

8. A disk array device comprising:
  a plurality of disk devices each having firmware and operating according to the firmware;
  at least one spare disk device having firmware and functioning as a spare for any of said plurality of disk devices; and
  a disk array control device connected to said plurality of disk devices as well as to said at least one spare disk device for controlling data transfer between an upper device and said plurality of disk devices, and between each of said disk devices and said at least one spare disk device, wherein said disk array control device comprises:
    a determining unit for determining whether any disk has been replaced during system operation,
    a reference disk selecting unit for selecting, when it is determined by said determining unit that any disk has been replaced, a reference disk from said at least one spare disk device, and
    a copying unit for copying firmware from the reference disk selected by said reference disk selecting unit into the replaced disk device.

9. A disk array device according to claim 8, wherein, when the replaced disk device has inhibited firmware, a copying operation by said copying unit is stopped based on the recognition that an error has occurred.

10. A disk array device comprising:
  a plurality of disk devices each having firmware including header information such as a version number of the firmware and operating according to the firmware;
  a disk device for loading with a plurality of types of firmware, each having a different firmware version number respectively stored therein; and
  a disk array control device connected to said plurality of disk devices as well as to said disk device for loading for controlling data transfer between an upper device and said plurality of disk devices and between each of said disk devices and said disk device for loading, wherein said disk array control device comprises:
    a storing unit for previously storing therein header information constituting firmware for each of said disk devices,
    a determining unit for determining whether any disk has been replaced during system operation,
    a reference firmware selecting unit for extracting, when it is determined by said determining unit that any disk has been replaced, firmware having a firmware version number equal to that of firmware for a disk device being replaced by the replaced disk device from among the firmware stored in said disk device for loading by referring to the header information stored in said storing unit and selecting the extracted firmware as reference firmware, and
    a copying unit for copying the reference firmware selected by said reference firmware selecting unit into the replaced disk device.

11. A disk array device with a plurality of disk devices, each disk device storing a control program, comprising:
  a detecting unit detecting when one of the plurality of disk devices has been replaced;
  a device selecting unit selecting, when said detecting unit detects a replaced disk device, one of the disk devices from the plurality of disk devices, other than the replaced disk device; and
  a copying unit copying and transferring the control program stored in the selected disk device to the replaced disk device.

12. A method for replacing one of a plurality of disk devices in a disk array device, comprising:
  detecting when one of the plurality of disk devices has been replaced;
  selecting, when one of the disk devices has been replaced, one of the disk devices from the plurality of disk devices, other than the replaced disk device; and
  storing a control program stored in the selected disk device to the replaced disk device.

* * * * *